United States Patent [19]
Trumbull et al.

[11] 3,902,798
[45] Sept. 2, 1975

[54] COMPOSITE PHOTOGRAPHY SYSTEM

[75] Inventors: Douglas H. Trumbull, Santa Monica; Dan Slater, Fullerton; Joseph L. Matza, Malibu; John C. Gale, Los Angeles, all of Calif.

[73] Assignee: Magicam, Inc., Santa Monica, Calif.

[22] Filed: Mar. 15, 1974

[21] Appl. No.: 451,590

[52] U.S. Cl. .................. 352/85; 352/44; 352/48; 352/53; 352/140
[51] Int. Cl.² ................................. G03B 21/32
[58] Field of Search ............ 352/85, 38, 44, 43, 48, 352/49, 50, 51, 52, 53, 70, 93, 140, 5

[56] References Cited
UNITED STATES PATENTS

| | | | |
|---|---|---|---|
| 1,979,937 | 11/1934 | Jackman | 352/5 |
| 2,178,228 | 10/1939 | Goldsmith | 352/140 X |
| 2,785,597 | 3/1957 | Gerard | 352/140 |
| 2,822,720 | 2/1958 | Douglas | 352/85 |

*Primary Examiner*—Monroe H. Hayes
*Attorney, Agent, or Firm*—Lindenberg, Freilich, Wasserman, Rosen & Fernandez

[57] ABSTRACT

A composite photography system of the registered matte type including a foreground camera movable linearly in X, Y and Z directions and in pan and tilt, and a background camera coupled with the former for corresponding movement so that the perspectives from which the cameras view their respective scenes remain substantially identical despite movement of the cameras relative to their viewed scenes. In a preferred form, the background camera views a background scene constructed on a different scale from the scale of the scene viewed by the foreground camera, and the coupling means includes scaling means for correspondingly modifying certain signals generated as functions of foreground camera movement. The scaling means also includes adjustable means for selectively changing the ratio of linear movement of the background camera relative to such movement of the foreground camera, in order to facilitate adaptation of the system for use with plural background scenes having different ratios of size relative to the foreground scene. When the background objects are in the form of a miniaturized set, the optical system of the background camera desirably includes a periscopic lens so that the camera proper can be spaced from the set. Means are provided in the mounting of the background camera for compensating for the effect of the displacement, in the typical mounting of the foreground camera, of the nodal point of its optical system from the mechanical center around which the foreground camera pivots in pan and tilt movements.

23 Claims, 31 Drawing Figures

PATENTED SEP 2 1975

SHEET 1

3,902,798

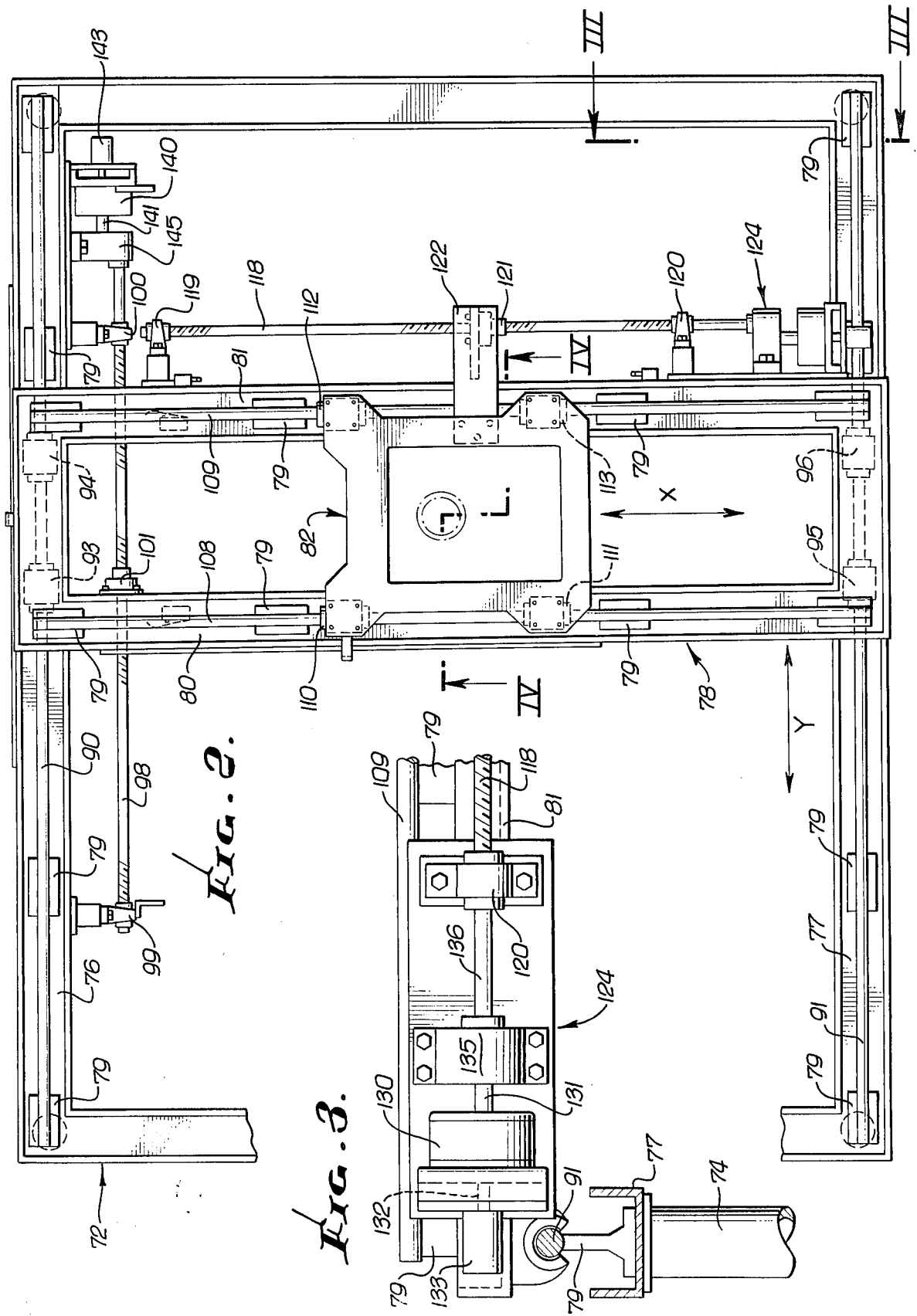

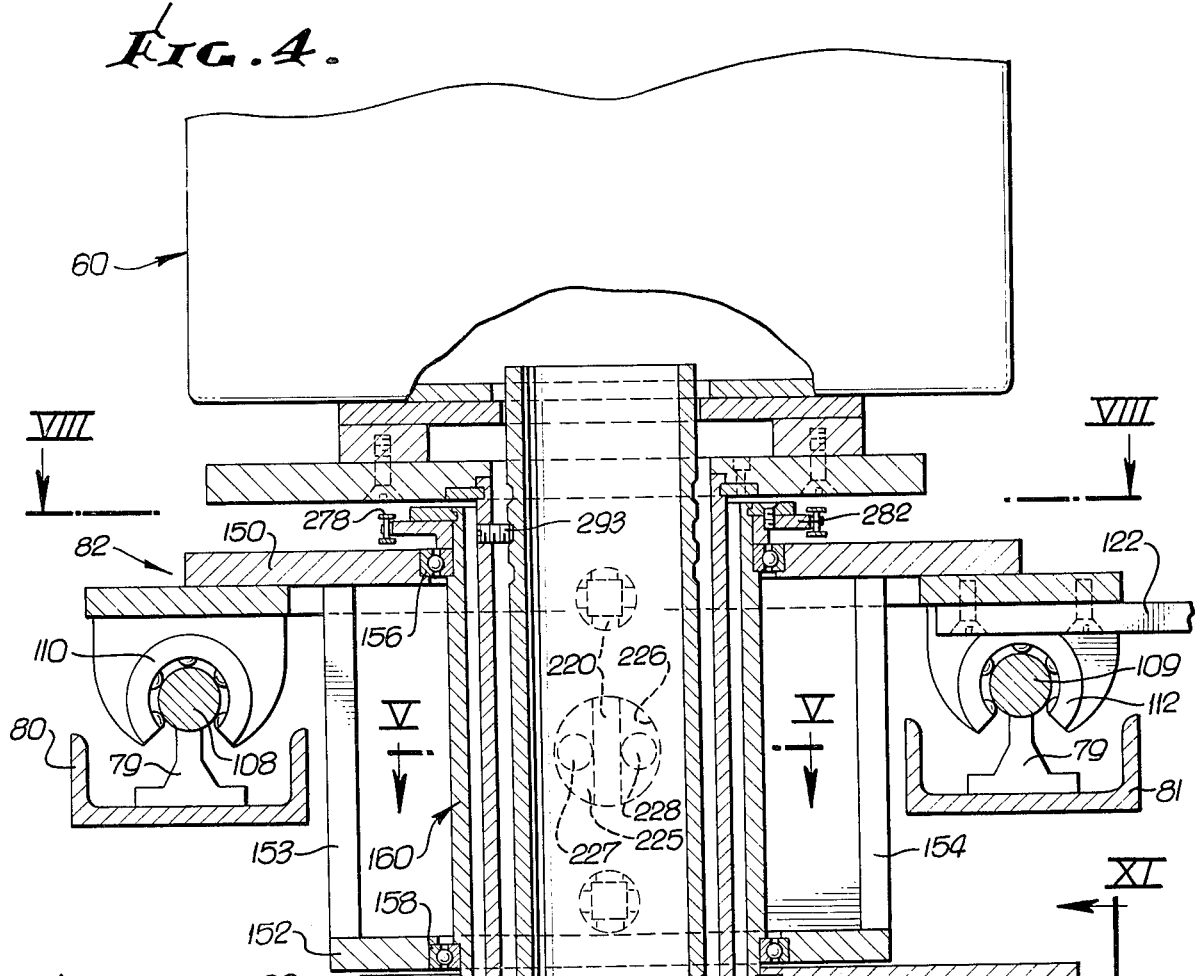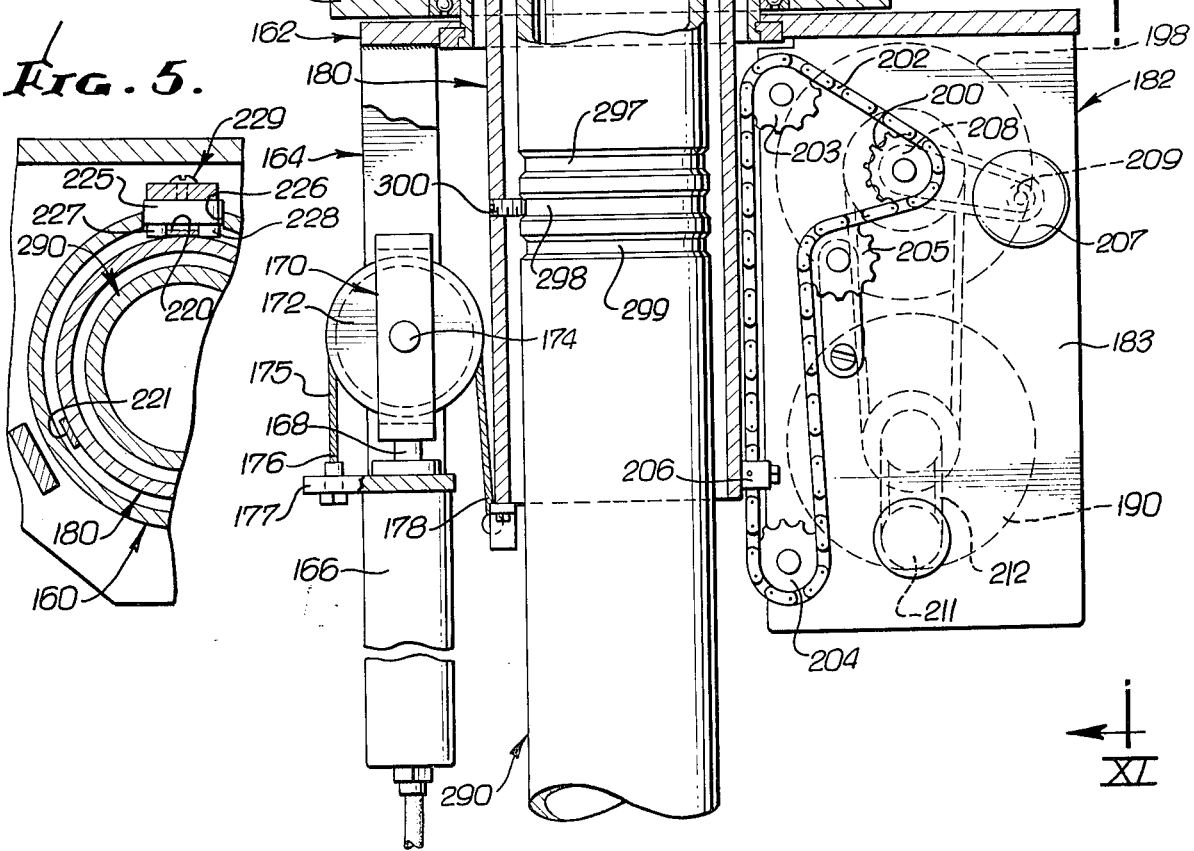

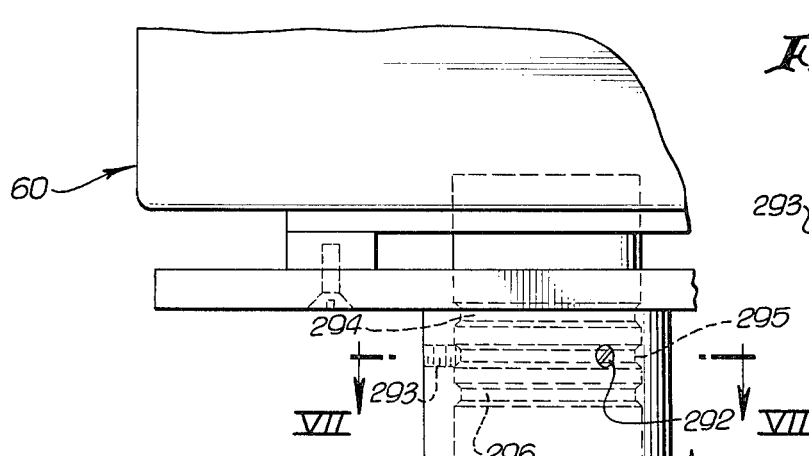
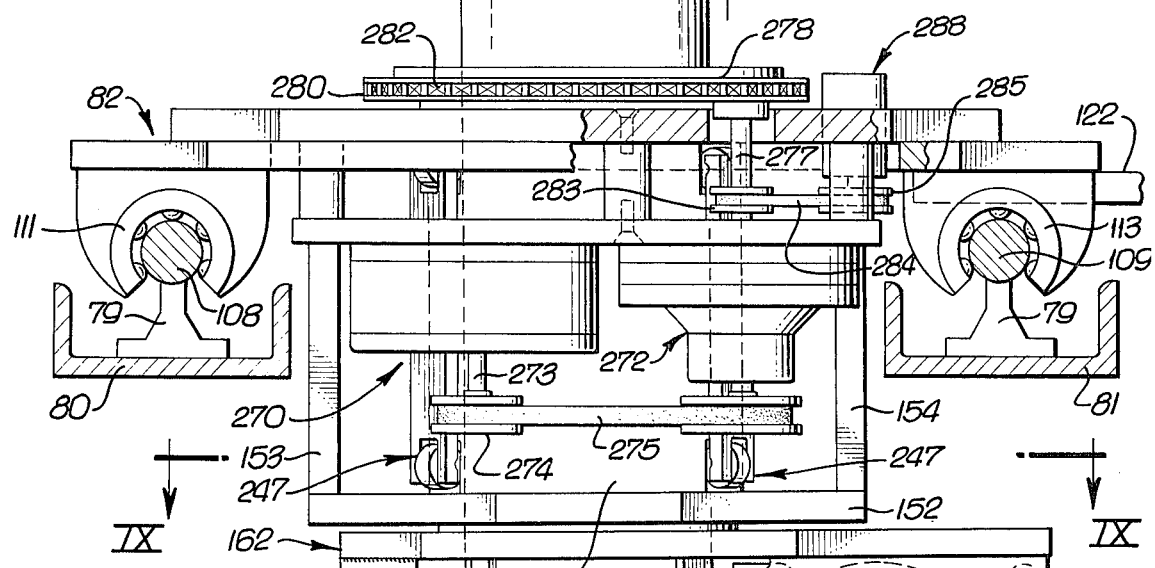
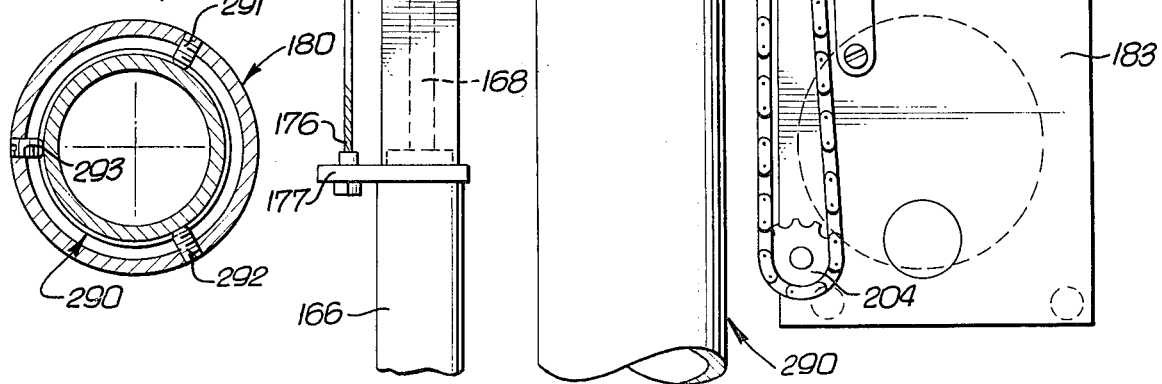

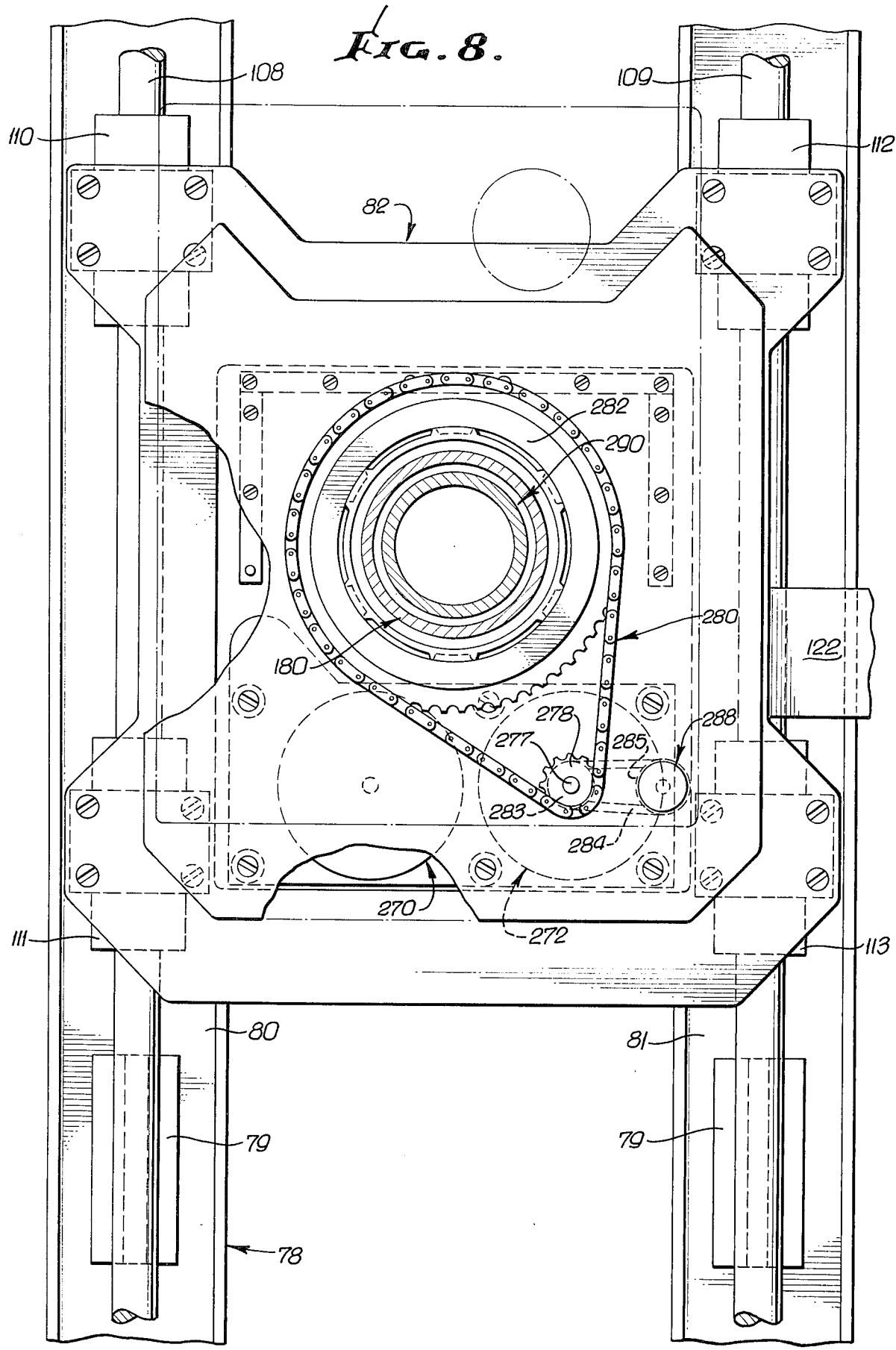

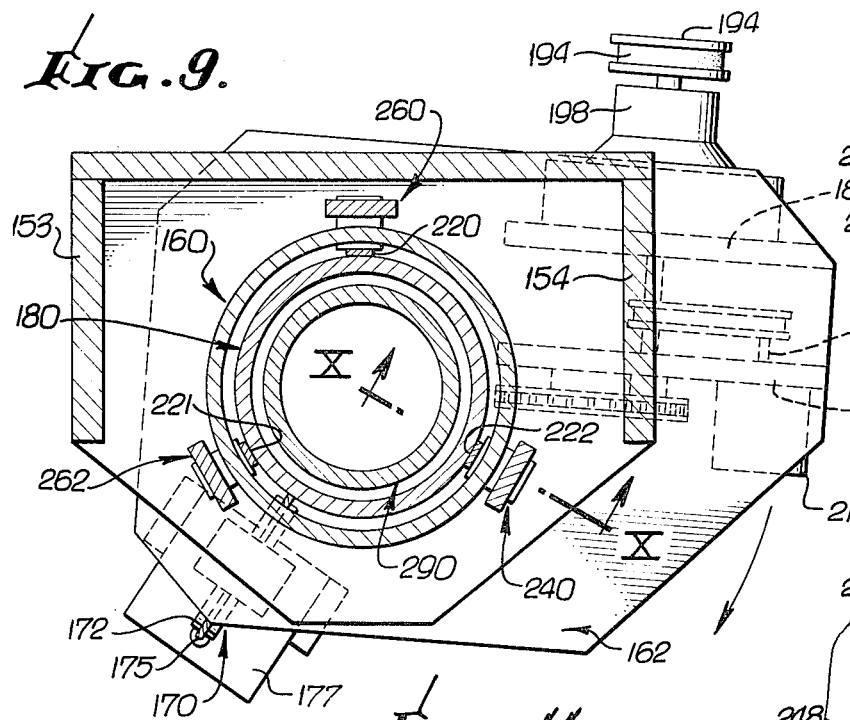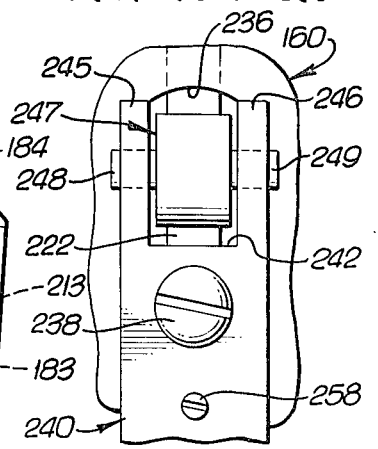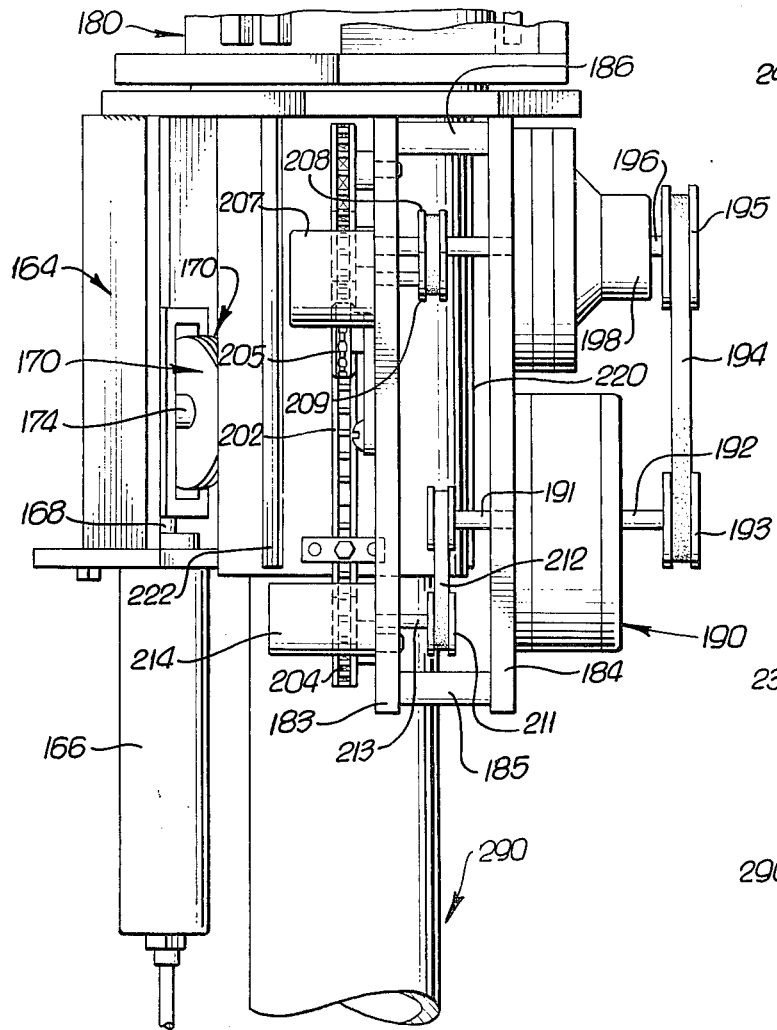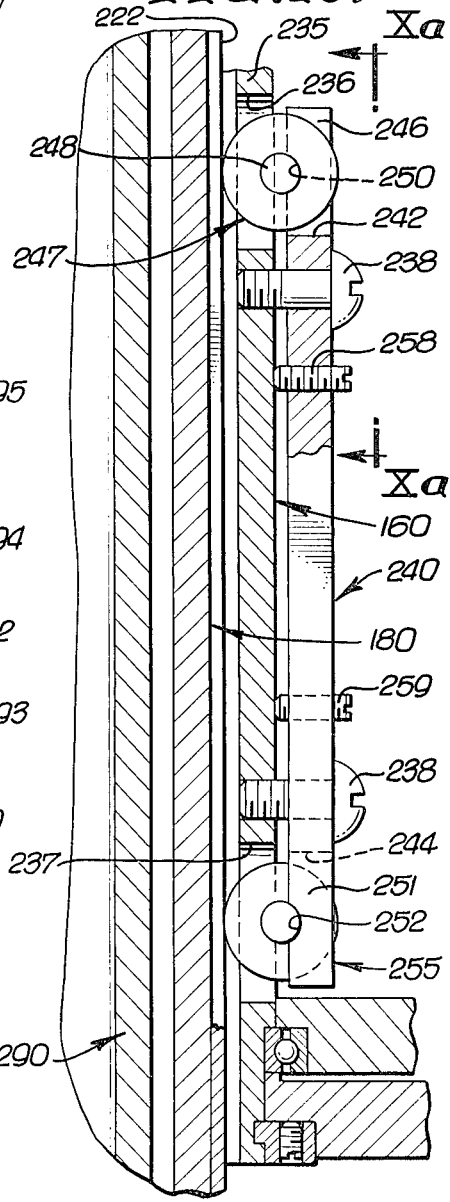

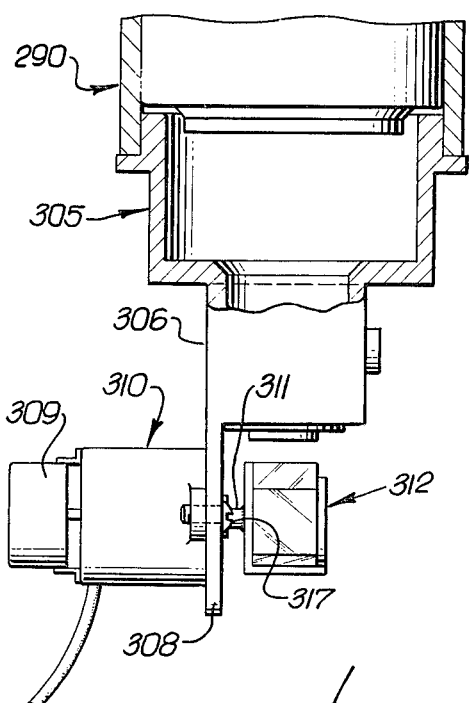
Fig. 13.
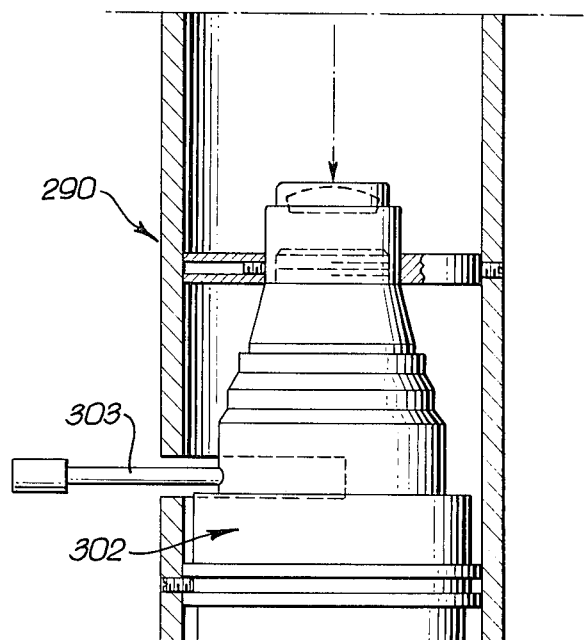
Fig. 12b.
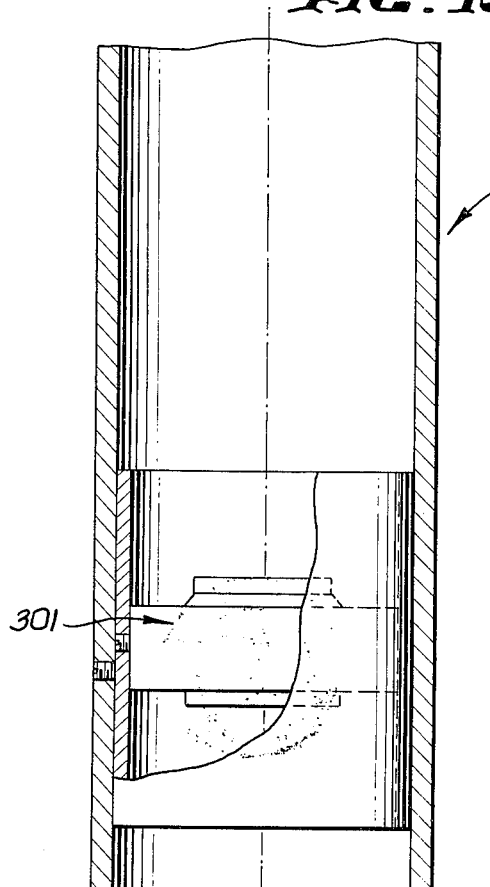
Fig. 12a.
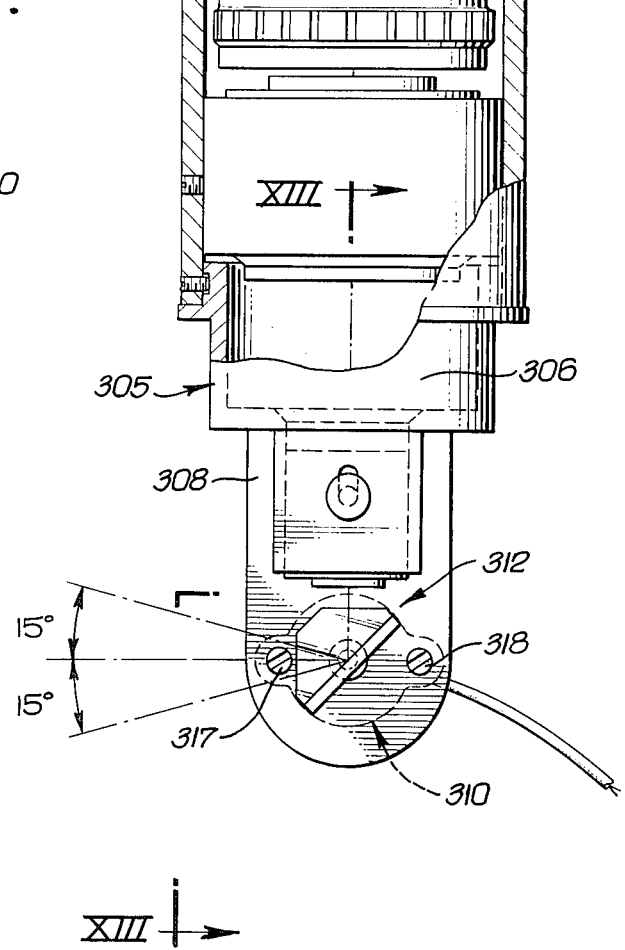

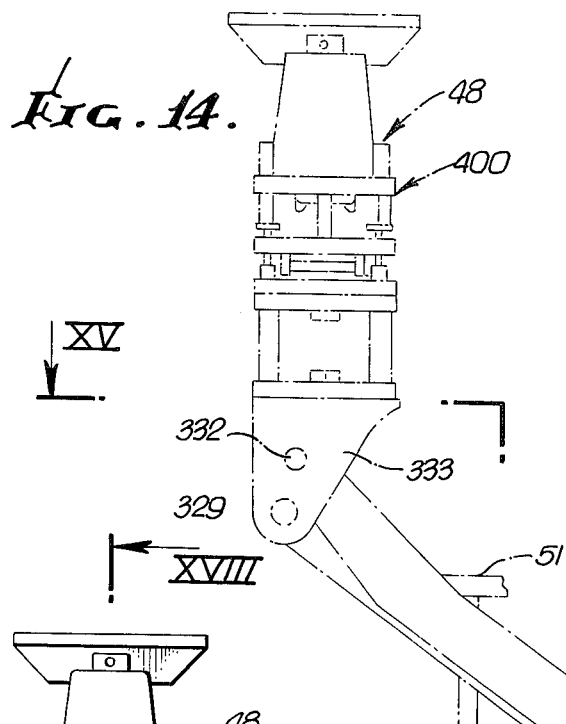
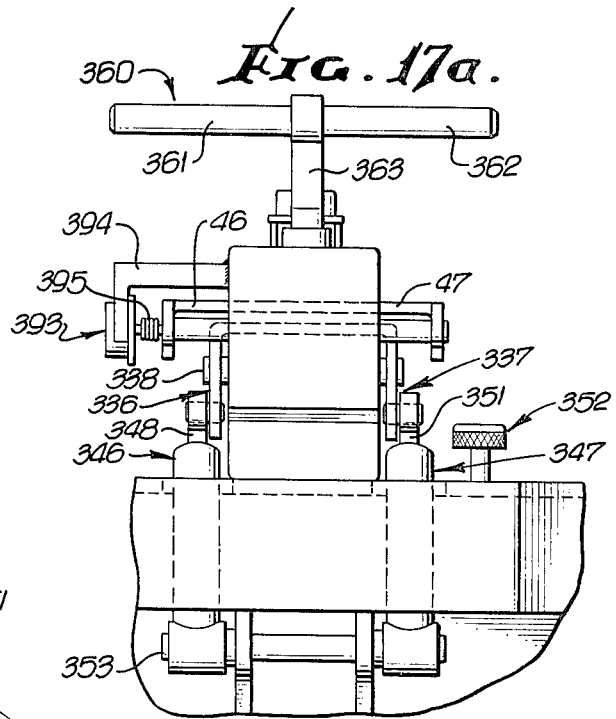
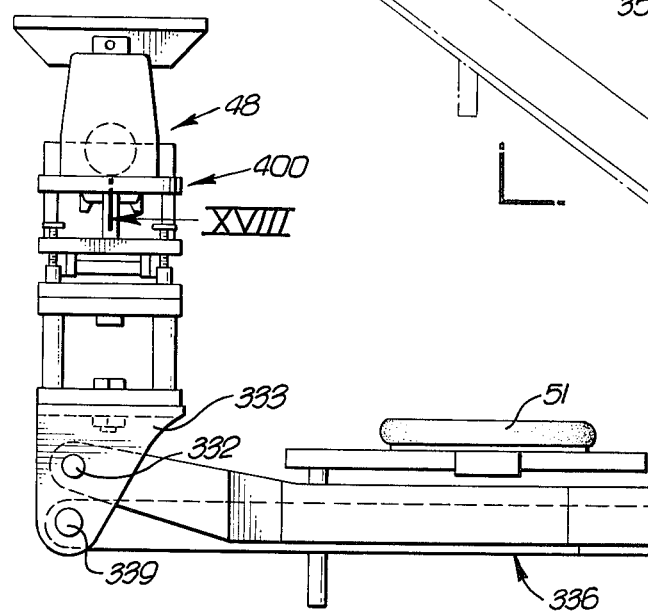
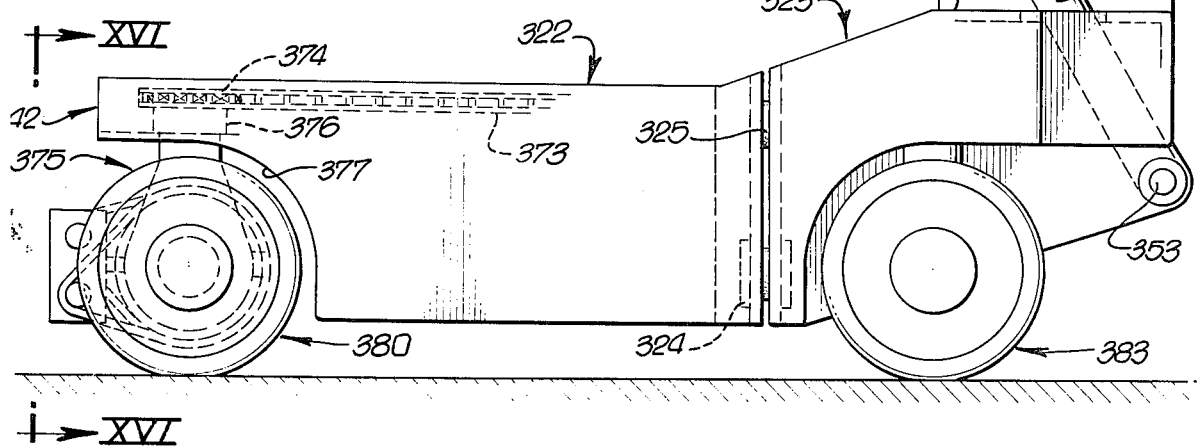

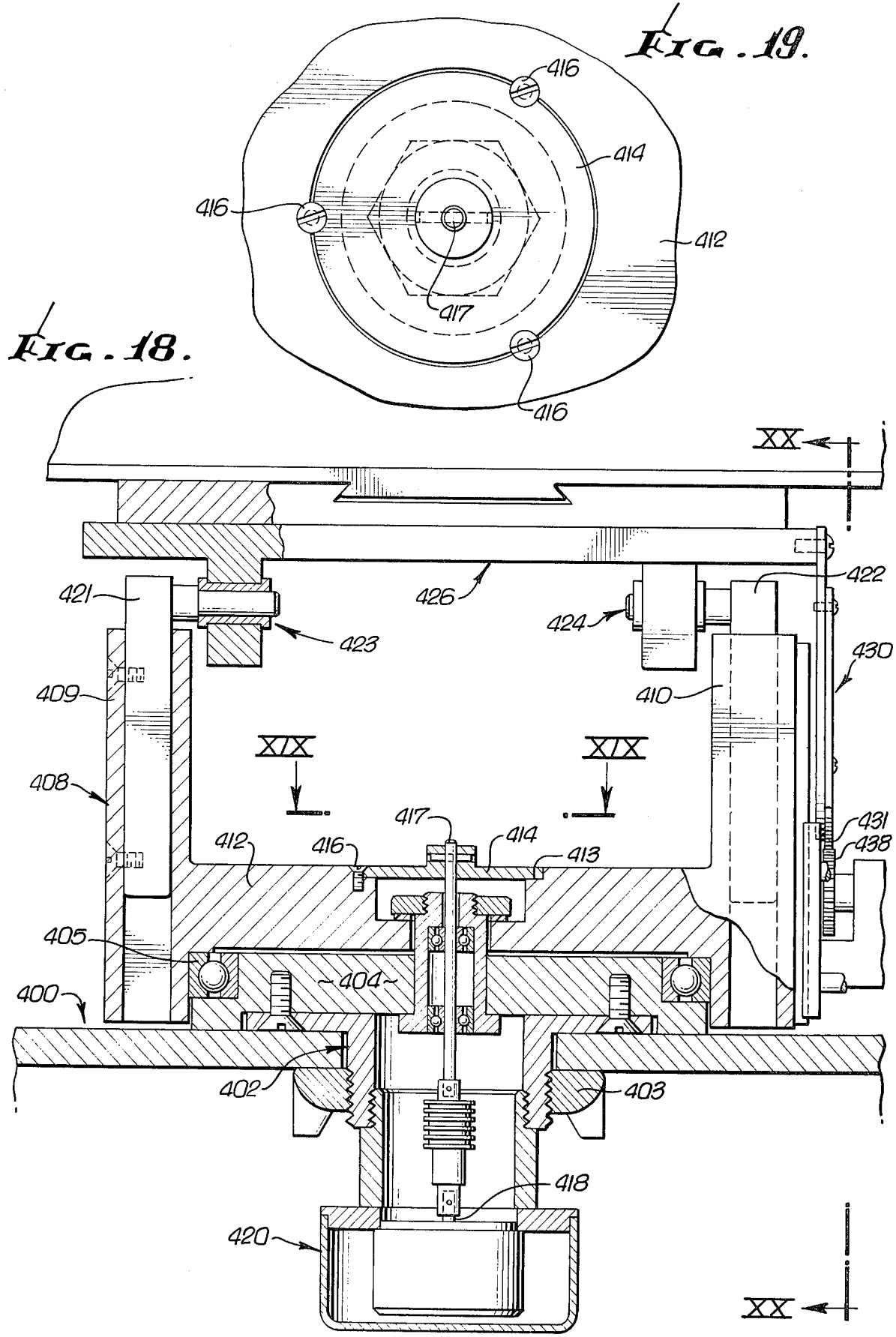

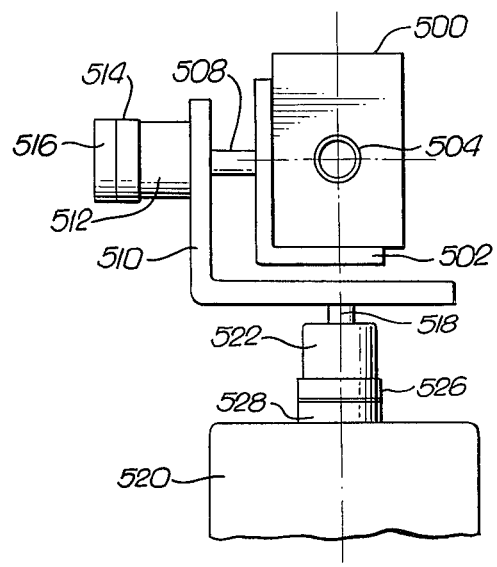
Fig. 25.
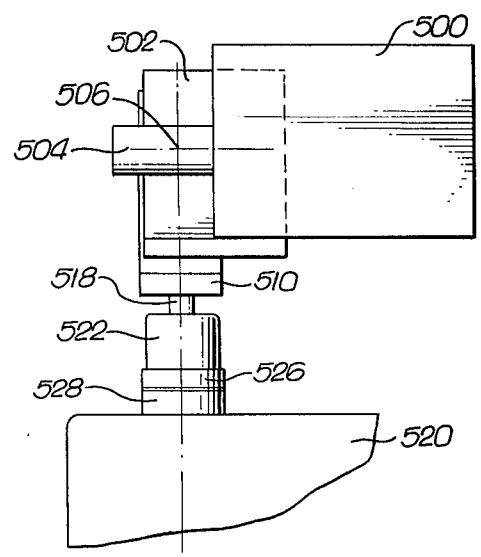
Fig. 26.
Fig. 27.
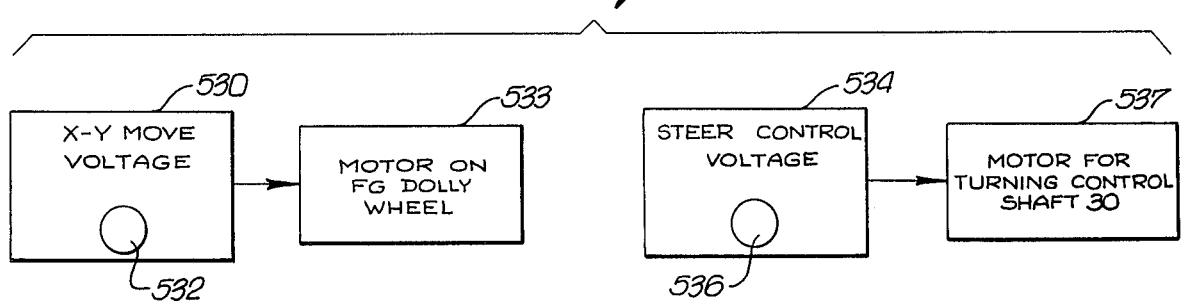
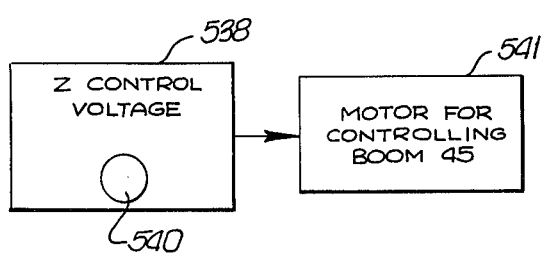
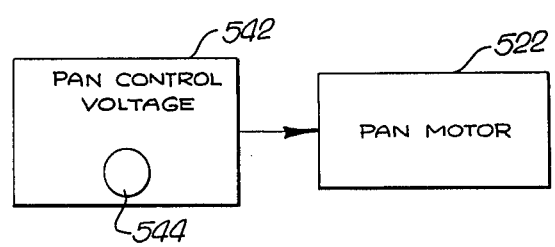
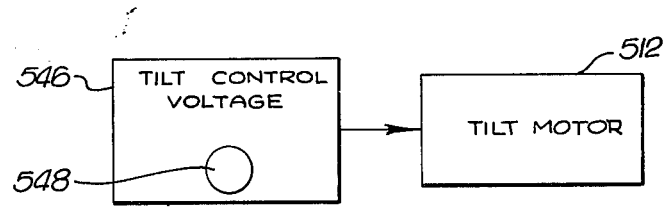

COMPOSITE PHOTOGRAPHY SYSTEM

BACKGROUND AND SUMMARY OF THE INVENTION

The present composite photography system provides improvements in the type of system in which foreground and background scenes are photographed by separate cameras, and the foreground scene is combined with the background scene to form the finished picture. The combining is accomplished by a process in which the portions of the background scene corresponding to the foreground objects are blanked out or masked. In film cameras the masking is accomplished by making an opaque matte of the foreground objects and printing the background scene masked by that matte. The foreground objects are then printed in the masked areas of the background to form the composite picture. When the system is used in cinematography, the cameras may be either film or television, and the foreground scene typically includes moving objects such as actors. Because the matte moves or travels from frame to frame, such a system has come to be referred to in the art as a traveling matte system.

A major problem in such a system is to maintain the registration of the two components within acceptable accuracy during relative movement of each camera and the objects constituting its frame of reference including the scene which it views. Unless registration is thus maintained, the desired illusion is lost. The required degree of accuracy depends upon the intended use of the finished composite picture. Wide screen motion picture projection, for example, requires much more accurate registration than, say, commercial television.

Existing traveling matte systems have not provided the capability of synchronized linear movement of the cameras relative to their respective frames of reference including their viewed scenes. The present invention provides this capability in the X, Y and Z directions, so that the cameraman can dolly, crab or pedestal as ordered by the director to achieve the desired artistic effect. Moreover, the objects viewed by the two cameras may differ in scale as to size. Thus in accordance with the present invention, the scene viewed by one of the cameras, typically the background ("BG" herein) camera, may be a miniaturized set, and the full size objects, typically actors, viewed by the foreground or FG camera will appear in the composite picture to be in a lifelike environment of the miniaturized set. The coupling means of the present invention for synchronizing linear movement of the FG and BG cameras includes means for scaling the movement of the one camera relative to the other in proportion to the relative scale of the objects viewed by the two cameras.

In the illustrative embodiment of the invention herein disclosed, coupling of the movement of the FG and BG cameras is provided by slaving BG camera movement to that of the FG camera, but it will be understood that such coupling could be accomplished in other ways, such as by controlling the movement of both cameras from a common control console, remote from both cameras. This would be appropriate, for example, where the environment of one or both cameras is adverse, by being dangerous, relatively inaccessible or the like.

In maintaining satisfactory registration in the present system, it is essential that the perspectives with which the FG and BG cameras view their respective scenes remain equal to each other during camera movement. As herein used, the term "nodal point" means the principal nodal point, i.e. the effective optical center of the lens as the image being viewed enters the optical system of the camera. In the typical mounting of the FG camera, its nodal point is not located at the center about which the camera pivots in pan and tilt, but instead is displaced substantially forward of that center. As a result of this nodal point displacement, pan or tilt movement of the FG camera causes its nodal point to describe an arc of a radius which may be substantial depending on the camera used. Consequently the perspective with which the FG camera views its scene changes during pan or tilt.

It may be noted that if synchronously coupled FG and BG cameras, identical to one another and identically mounted, view scenes on the same scale of size, then no correction for nodal point displacement would be needed — the perspectives with which the cameras would view their respective scenes would remain synchronized during pan and tilt. However, in the preferred form of the present invention, employing a miniaturized background set, the above conditions do not obtain, and compensation must accordingly be made for nodal point displacement in order to maintain satisfactory registration during pan and tilt.

The optical system of the BG camera of the present invention includes a periscopic lens tube mounted so that its optical axis, and that of the BG camera, are vertical, and a reflector such as a prism or mirror is mounted at the end of the lens tube opposite the camera, by which to reflect light from the background scene into the tube. Means are provided in the mounting of the BG camera for substantially compensating in pan for nodal point displacement of the FG camera and for refining that compensation, including means for displacing the optical axis from the mechanical axis around which the BG camera rotates in pan. Means may be provided in the optical system of the BG camera for compensating in tilt for nodal point displacement of the FG camera, comprising means for selectively adjusting the reflector location relative to the lens tube optical axis.

Although the description of the illustrative embodiment of the invention refers to movement of the FG camera, with synchronized corresponding movement of the BG camera, it will be understood that the important characteristic of the system as applied to cinematography is relative movement between the FG camera and the frame of reference of its viewed scene. For example, assume that an actor is to be photographed walking from left to right, as viewed by the FG camera, along a city street of which the background set is a miniaturized reproduction. The actor could walk on a treadmill, and the treadmill would of course be suppressed from the image seen by the FG camera, which would itself remain stationary. The frame of reference of the FG camera is thus the moving treadmill, so that relative movement between it and the stationary FG camera would be coupled to the BG camera to cause the latter to move appropriately relative to the stationary set in order to maintain the perspectives of the two cameras the same.

Accordingly, the principal object of the present invention is to disclose novel improvements in a composite photographic system. Other objects and purposes are to disclose, in such a system adapted for cinematography and using FG and BG cameras, means for coupling movement of the cameras relative to their respective frames of reference whereby to maintain their respective viewed scenes in substantially equal perspective during such movement; to disclose means in such a system for using a miniaturized background set viewed by the BG camera through a periscopic lens tube; to disclose in such a system means for compensating for displacement of the nodal point of the FG camera from its mechanical center of movement in pan and tilt; to disclose in such a system using a miniaturized set means for scaling linear movement of the BG camera compared to that of the FG camera, and for selectively adjusting that scale; and for other and additional objects as will be understood from the following description of a preferred embodiment of the invention and the accompanying drawings.

BRIEF DESCRIPTION OF THE DRAWINGS

FIG. 2 is a top plan view, with a portion broken away, of the support table for the BG camera.

FIG. 3 is a fragmentary view taken on the arrows III—III of FIG. 2.

FIG. 4 is a sectional view taken on the broken line IV—IV of FIG. 2, showing details of the camera support means, the camera being shown in approximately its lowermost position.

FIG. 5 is a fragmentary sectional view taken on arrows V—V of FIG. 4.

FIG. 6 is a side elevational view corresponding generally to the sectional view of FIG. 4, but showing the BG camera at its uppermost position.

FIGS. 7 and 7a are sectional views looking downwardly on arrows VII—VII of FIG. 6, showing different adjustments of the periscopic lens tube within its supporting sleeve.

FIG. 8 is a plan view looking downwardly on arrows VIII—VIII of FIG. 4.

FIG. 9 is a sectional view looking downwardly on the arrows IX—IX of FIG. 6.

FIG. 10 is a vertical sectional view taken on arrows X—X of FIG. 9.

FIG. 10a is a fragmentary view taken on arrows Xa—Xa of FIG. 10.

FIG. 11 is an elevational view taken on arrows XI—XI of FIG. 4.

FIG. 12a is a fragmentary vertical sectional view of the upper portion of the periscopic lens tube showing part of the lens system.

FIG. 12b is a vertical sectional view of the lower portion of the tube shown in FIG. 12a, showing the mechanism for tilting the image seen by the BG camera.

FIG. 13 is a sectional view taken on arrows XIII—XIII of FIG. 12b.

FIG. 14 is a side elevational view of a typical dolly used in the practice of the invention, showing in solid lines the boom and pedestal in their lowermost positions and, in dotted outline, the boom and pedestal in an upper position.

FIG. 17a is a fragmentary view taken on arrows XVIIa—XVIIa of FIG. 17.

FIG. 18 is a sectional view taken on the arrows XVIII—XVIII of FIG. 14.

FIG. 19 is a fragmentary plan view looking downwardly on arrows XIX—XIX of FIG. 18.

FIGS. 25 and 26 are respective front and side views of a nodal point mounting system for a camera.

FIG. 27 is a schematic diagram of a system which can remotely control foreground and thereby background cameras.

DETAILED DESCRIPTION

Figure 1:
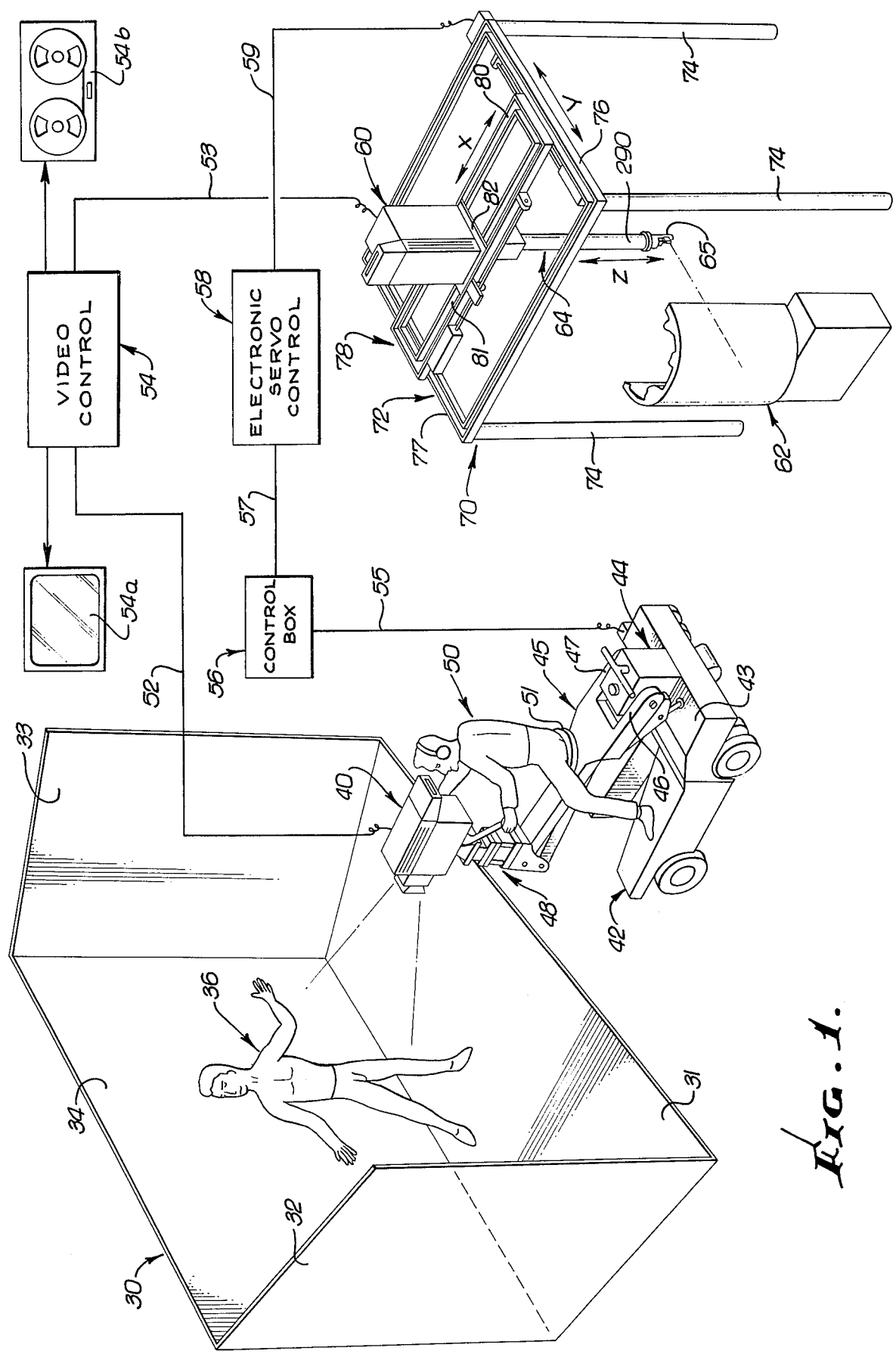
FIG. 1 is a perspective view, partially diagramatic, of apparatus in accordance with the invention.

In the partially diagramatic showing of FIG. 1, there is indicated generally at 30 a stage including a floor 31, sidewalls 32 and 33 and a rear wall 34. The upper surface of floor 31 and the inner surfaces of walls 32, 33 and 34 are colored or otherwise treated to perform the keying function. Thus, when the present invention is used in connection with the blue-screen system, then the surfaces just mentioned are colored blue. Standing on the floor 31 is an actor indicated generally at 36, within the field of view of a foreground (FG) camera indicated generally at 40. That camera, here shown as a television camera, is mounted on a dolly indicated generally at 42 and provided in its rear portion with a platform 43 having a stanchion 44 projecting upwardly therefrom. A boom indicated generally at 45 is bifurcated in its rear portion, providing a pair of legs 46, 47, which are journaled to stanchion 44 for pivotal rotation about a horizontal axis.

Means are provided on dolly 42 for pivotally moving boom 45 between uppermost and lowermost positions (compare FIG. 14) including pantograph means for maintaining the axis of camera support pedestal 48 vertical during such movement. A cameraman indicated generally at 50 sits on a seat 51 mounted on the upper portion of the boom 45, substantially midway of its length.

The video output of camera 40 is fed through cable 52 to a video control box indicated generally at 54. Signals carrying intelligence as to movement of camera 40 horizontally, vertically and in pan and tilt are fed through a cable 55 to a control box indicated generally at 56 and thence through cable 57 to an electronic servo control box indicated generally at 58. The electrical components just referred to will be described in detail hereinafter.

A background (BG) camera is indicated generally at 60, and means are provided for coupling the movement of FG camera 40 and BG camera 60 in X, Y and Z directions and in pan and tilt. BG camera views a miniature set indicated generally at 62 through a downwardly extending periscopic lens indicated generally at 64 having at its lower end a mirror or prism 65.

A support stand indicated generally at 70 includes an upper rectangular frame indicated generally at 72 supported at its corners by vertical legs 74 resting on the floor. Frame 72 includes a pair of parallel oppositely disposed side legs 76 and 77, and a rectangular dolly frame indicated generally at 78 is mounted for linear movement on legs 76, 77 in the Y direction. Dolly frame 78 itself has a pair of spaced parallel legs 80 and 81 on which a carrier 82 is mounted for transverse movement in the X direction, and which supports BG camera 60.

The video output of BG camera 60 is fed through cable 53 to the video control 54 whose output may be fed to either or both of monitor 54a or videotape recorder 54b. Signals from electronic servo control 58 are fed through cable 59 to support stand 70, in order to control the movement of camera 60 in X, Y, Z, pan and tilt.

Frame 72 of support stand 70 is seen in greater detail in FIGS. 2 and 3. Side leg 77 is desirably in the shape of an upwardly open U channel (leg 76 being similarly constructed), and within each of the channeled legs there are provided a series of spaced upstanding supports 79 for carrying at their upper ends straight smooth support rods 90 and 91 respectively.

Dolly frame 78 is carried on support rods 90, 91 for horizontal movement therealong in the Y direction, desirably through a set of travel bearings, including a pair of such travel bearings 93, 94 rollably supported on rod 90, and a similar pair of traveling bearings 95 and 96 similarly supported for movement along rod 91. Means are provided for driving dolly table 78 in the Y direction, including a threaded drive screw 98 journaled in bearings 99, 100, fixed to leg 76. Drive screw 98 engages a threaded traveling nut 101, which is fixed to one of the transverse legs of dolly frame 78. Means indicated generally at 102 serve to rotate drive screw 98 through motor means under the control of electronic servo control 58, and thus to drive dolly frame 78 forwardly or rearwardly in the Y direction.

Similarly, means are provided in accordance with the invention for driving camera carrier 82 leftwardly or rightwardly in the X direction along dolly frame 78. Legs 80 and 81 of the dolly frame desirably take the form of upwardly open U-shaped channels, similar to legs 76, 77 heretofore described, and the legs are provided with a number of upwardly extending supports 79 spaced therealong similar to supports 79 heretofore illustrated and described in connection with legs 76 and 77. The supports 79 of legs 80 and 81 support at their upper ends a pair of elongated smooth support rods 108 and 109 respectively, on which carrier 82 is movably mounted as by travel bearings 110 and 111, engaging rod 108, and by travel bearings 112 and 113 engaging support rod 109.

Means are provided for driving the table or carrier 82 leftwardly or rightwardly in the X direction, similar to the means heretofore described in connection with the corresponding movement in the Y direction of dolly frame 78. Thus a drive screw 118 is journaled near each of its ends in bearings 119 and 120, each fixed to side leg 81 of the dolly frame, and a traveling nut 121 is threadedly engaged with drive screw 118, traveling nut 121 being mounted under a bracket 122 fixed to carrier 82.

Means are provided for rotating drive screw 118, and thus to drive carrier 82. Those drive means are indicated generally at 124 in FIG. 2, and are seen in greater detail in FIG. 3. Thus drive means 124 includes a motor 130 having a pair of oppositely directed output shafts 131 and 132, the latter driving a tachometer generator 133. Output shaft 131 is connected to a gear reduction transmission 135, whose output shaft 136 is connected directly to drive screw 118, journaled in bearing 120.

Drive means 102, previously referred to as the drive means for dolly frame 78, includes components corresponding to those just described in connection with drive means 124, specifically a drive motor 140 for driving a tachometer generator 143 and, through output shaft 141 and gear reduction transmission 145 and its output shaft 146, for rotating drive screw 98.

Referring now to FIG. 4, means are provided for mounting BG camera 60 on carrier plate 82, for moving the camera vertically in the Z direction, and for rotating the camera to accomplish pan movement. Thus carrier table assembly 82 includes an upper plate 150 and a lower plate 152 joined by vertically extending spacer plates of which two are shown at 153 and 154, fixed at their opposite ends to the upper and lower plates. Each of the upper and lower plates 150, 152 is centrally apertured and is provided with an anti-friction bearing 156 and 158 respectively for rotatably supporting a vertically extending collar indicated generally at 160, which carries at its lower end a horizontal collar plate indicated generally at 162.

Fixed to the lower surface of collar plate 162 and extending downwardly therefrom in the left portion of FIG. 4 is a bracket indicated generally at 164, which supports at its lower end a cylinder 166 containing a fluid under pressure and serving as a counterbalance for the weight of the vertically movable parts. Projecting upwardly from within cylinder 166 is a piston 168, which carries at its upper end an upright hollow rectangular frame indicated generally at 170 (compare FIG. 11) within which a sheave 172 is rotatably journaled about horizontal axis 174. A cable 175 extends approximately halfway around sheave 172, and its outer end 176 is anchored to the structural member 177 at the lower end of bracket 164. The other end 178 of cable 175 is fixed to the lower portion of an elongated cylindrical sleeve indicated generally at 180. Means are provided for moving sleeve 180 and the parts fixed thereto in the vertical or Z direction during operation in accordance with the present invention. Fixed to the lower surface of plate 162 and extending downwardly therefrom is a support assembly indicated generally at 182, including a pair of spaced parallel plates 183 and 184 (compare FIG. 11), joined by lower and upper spacer members 185, 186 respectively. Mounted on the outer face of the lower portion of plate 184 is an electric motor indicated generally at 190 having oppositely projecting output shafts 191 and 192, the latter having mounted thereon a sheave 193 driving a belt 194 which engages a sheave 195. The latter sheave is mounted on shaft 196 of a gear reduction transmission 198.

Output shaft 199 of transmission 198 has mounted thereon a drive sprocket 200 engaging a chain 202 which is trained around upper and lower idler sprockets 203 and 204 respectively and a tensioning sprocket 205. Chain 202 is clamped to a bracket 207 fixed to the outer surface of sleeve 180, adjacent to the lower edge of that sleeve. It will thus be seen that clockwise movement of chain 202, as driven by motor 190, and as assisted by the counterbalancing force of piston 168 acting through sheave 172, will raise sleeve 180 from its lower position seen in FIG. 4 to its upper position seen in FIG. 6. The amount and direction of such vertical movement are controlled by a positional servo system wherein the control signal is a function of the position of the moving camera, as distinguished from being a function of its rate of movement. Here the positional servo system includes motor 190 and a potentiometer 207 driven by transmission shaft 199 through belted sheaves 208 and 209. Means may be provided for stabilizing the operation of the system, as by the use of a rate feedback tachometer. As seen in FIG. 11, the leftwardly extending output shaft 191 of motor 190 has mounted thereon belt 212. Sheave 211 is mounted on drive shaft 213 of a tachometer generator 214 mounted on plate 183.

Vertical movement of sleeve 180 within collar 160 is accurately guided by means now to be described, in connection first with FIGS. 4 and 5. Sleeve 180 is provided on its outer cylindrical surface with a set of three vertically extending metal strips of lands equally spaced at 120° about the circumference of the sleeve, two of the lands being seen at 220 and 221 in FIG. 5. Means are provided in collar 160 for preventing rotation of sleeve 180 relative to the collar, while permitting relative vertical movement of those two structures. Thus a disc 225 is mounted in a circular opening 226 formed in the sidewall of collar 160, and disc 225 carries a pair of spaced rotatable rollers 227 and 228, which contact the sidewalls of land 220. Disc 225 is held in place relative to collar 160 by retaining means indicated generally at 229.

Means are provided for coacting with lands 220, 221 and 222 in maintaining sleeve 180 exactly concentric within collar 160. The outer surfaces of lands 220, 221 and 222 are planar, and are contacted by upper and lower sets of rollers carried by collar 160. More specifically, and with reference to FIGS. 9 and 10, the sidewall 235 of collar 160 has formed therein upper and lower openings, preferably round, indicated at 236 and 237 respectively. Between the two openings there is attached to wall 235 by means 238 a retainer bar indicated generally at 240, whose upper and lower ends are bifurcated to form upper and lower yokes 242 and 244 respectively.

As best seen in FIG. 10a, upper yoke 242 includes a pair of spaced legs 245, 246, between which is mounted a roller indicated generally at 247, having a pair of oppositely extending stub axles 248 and 249. Each of the legs 245 and 246 is provided on its inner face with a rounded recess constituting a partial bearing for one of the stub axles 248, 249, the recess of leg 246 being indicated at 250 in FIG. 10. The corresponding recess in leg 251 of lower yoke 244 is more clearly seen at 252. The other components of the lower portion of retainer bar 240 are identical to the corresponding components in the upper portion of the bar, and serve to rollably retain a lower roller indicated generally at 255 in contact with land 222, in the same manner as upper roller 247 is held in such rollable contact. Means are provided for adjustably controlling force with which retainer bar 240 holds rollers 247 and 255 in contact with land 222, and such means are here shown as including upper and lower set screws 258 and 259 respectively, threadedly received in retainer bar 240. The inner ends of set screws 258, 259 bear against the outer surface of wall 235. Adjustment of set screws 258, 259 serves to slightly flex the upper and lower portions of retainer bar 240 about the respective attachment screws 238, so that the rollers can be maintained in fairly tight contact with land 222, without sufficient force to cause binding of the mechanism during vertical movement of sleeve 180 relative to collar 160.

It will be understood that identical retainer bar assemblies, spaced at 120° from retainer bar 240 and indicated generally at 260 and 262 in FIG. 9, cooperate with vertically extending lands 220 and 221 respectively, whereby to maintain concentricity of collar 160 and sleeve 180 during vertical movement of the latter.

As previously mentioned, means are provided for rotating collar 160 and thereby sleeve 180, for accomplishing pan movement of the BG camera, and such means will now be described in connection with FIGS. 4, 6 and 8. As best seen in FIG. 6, a motor indicated generally at 270 drives a gear reduction transmission indicated generally at 272 through output shaft 273, sheave 274 mounted thereon, belt 275 and sheave 276 mounted on the input shaft of transmission 272. The output shaft 277 of transmission 272 extends upwardly from the transmission and at its upper end has mounted thereon a drive sprocket 278. Also mounted on output shaft 277 is a sheave 283 which, through belt 284 and sheave 285, drives a potentiometer indicated generally at 288. As best seen in FIG. 8, a chain indicated generally at 280 is trained around drive sprocket 278 and driven sprocket 282, which in turn is fixed to the upper end of collar 160. Thus rotational output of motor 270 will cause rotation of large sprocket 282 and thus of collar 160, supported by bearings 156 and 158.

Within sleeve 180 and supported thereby is mounted a periscopic lens tube indicated generally at 290, which extends downwardly from BG camera 60. Means are provided for mounting lens tube 290 either concentrically or eccentrically within sleeve 180. With reference to FIGS. 6 and 7, it will be seen that sleeve 180 is provided with three set screws 291, 292 and 293 threaded in the sidewall of the sleeve, and the inner ends of the set screws are received in one of a set of annular grooves, here three in number, indicated at 294, 295 and 296, formed in the outer cylindrical wall of tube 290. A similar set of peripheral grooves 297, 298 and 299 is formed in the sidewall of tube 290, spaced below the grooves 294, 295, 296. This lower set of grooves is similarly engageable by the inner ends of three set screws arranged at 120° about the tube 290, one of the screws engaging groove 298 being indicated at 300. For reasons later appearing, it may be desirable to adjust the two groups of set screws so that tube 290 is maintained concentrically within sleeve 180, as shown in FIG. 7; or it may be desirable that the tube be eccentrically mounted within the sleeve, as shown in FIG. 7a. In either case, it will be understood that the lower and upper groups of three set screws are similarly adjusted, so that the axes of the tube 290 and sleeve 180 are parallel to one another.

With reference to FIGS. 12a, 12b and 13, means are provided for controlling the tilt angle at which the BG camera sees its subject matter. Thus, lens tube 290 has mounted therein a lens element indicated generally at 301, and below lens element 301 a zoom lens indicated generally at 302, provided with a control arm 303 for adjusting the effective focal length of the zoom lens. At the lower end of tube 290 there is provided a cylindrical housing indicated generally at 305 having a downwardly extending cylindrical neck 306, and a bracket plate 308 projects downwardly and has mounted thereon a motor indicated generally at 310 coupled to a potentiometer 309. The output shaft 311 of the motor has mounted thereon a prism indicated generally at 312. In its position seen at the bottom of FIG. 12b, prism 312 is inclined at 45° to the vertical so that the effective field of view of the BG camera is horizontal. As further indicated at the bottom of FIG. 12b, rotation of motor 310 adjusts prism 312 through an angle of approximately 30°, to provide tilt perspective for the BG camera.

Means are provided for holding the prism 312 in position on the optical axis of the periscopic lens system. Such means are here shown as including a pair of slots 315 and 316 formed in bracket plate 308, for receiving in the slots attachment screws 317 and 318 respectively. A hole 320 is formed in bracket plate 308, to enable output shaft 311 to extend therethrough.

Figure 17:
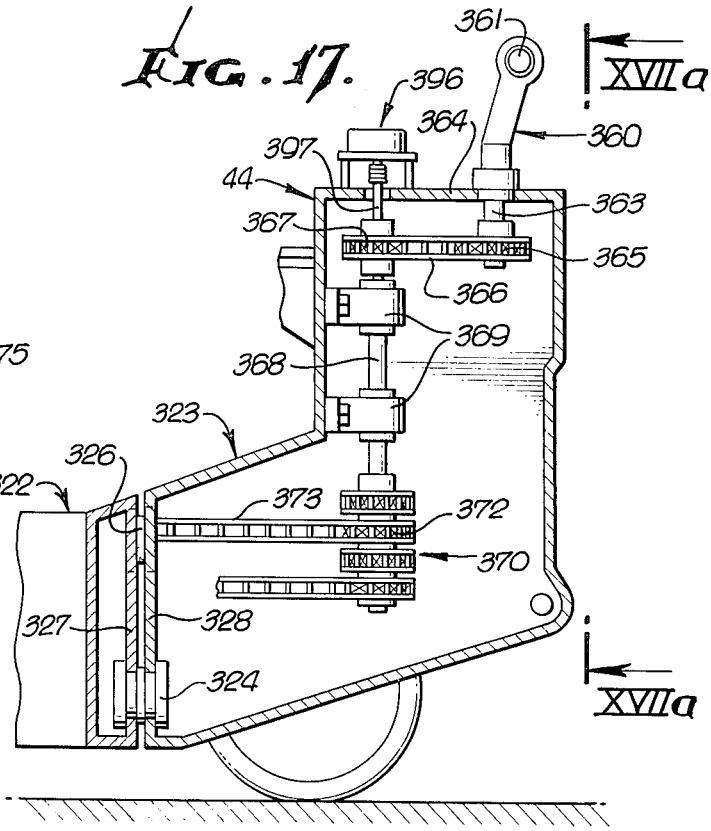
FIG. 17 is a vertical sectional view taken on arrows XVII—XVII of FIG. 15.
Figure 15:
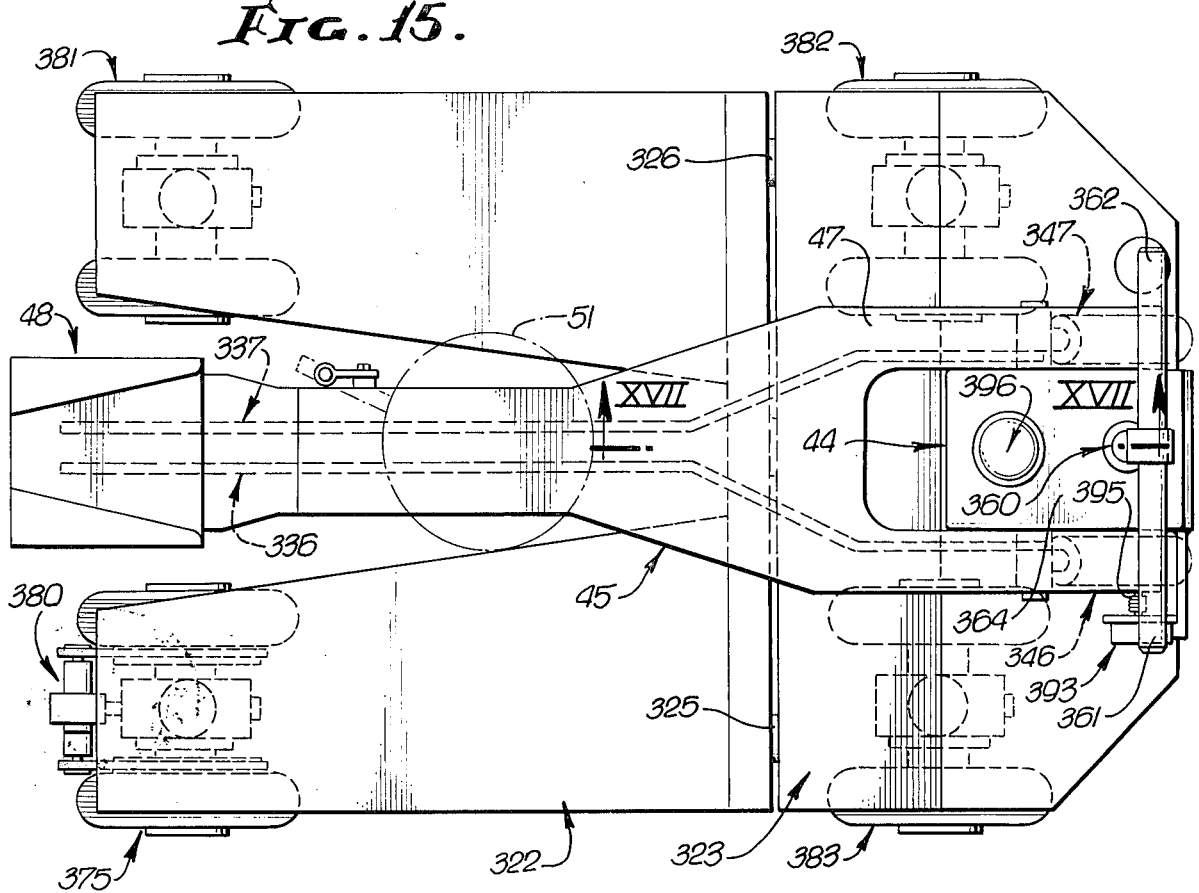
FIG. 15 is a top plan view of the dolly taken on arrows XV—XV of FIG. 14.

The support mounting for the FG camera will now be described in conjunction with FIGS. 14–21. As best seen in FIGS. 14, 15 and 17, dolly 42 comprises front and rear sections indicated generally at 322 and 323 respectively, the two sections being in articulated relation in order to insure that all wheels remain in contact with the supporting floor despite irregularities in the floor surface. The articulated relation is maintained by a centrally disposed strong pivotal connector 324 joining the two sections, and a set of spacer shock pads 325 and 326 located above connector 324 and spaced laterally on either side of the connector between the rear wall 327 of front section 322 and the front wall 328 of rear section 323.

The rear legs 46 and 47 of boom 45 are mounted on stanchion 44 for pivotal movement in a vertical plane about a horizontal axis 330. In such movement, boom 45 essentially constitutes a radius arm, the distal point of the arm being its pivotal connection 332 in a lower U-shaped bracket 333 of FG camera support pedestal 48.

Means are provided for raising or lowering boom 45 about its horizontal axis 330, while maintaining FG camera pedestal 48 in its vertical orientation. Such means are here shown as including a pair of elongated actuator arms indicated generally at 336 and 337, symmetrically disposed as seen in plan in FIG. 15. The rear ends of the actuator arms are pivotally connected to stanchion 44 for rotation about a common horizontal axis 338, and their distal ends are pivotally connected at 339 to pedestal bracket 333. The relationship between the boom and arm pivotal axes 330 and 338 is identical to the relationship between the distal boom and arm pivotal axes 339 and 332, in order to maintain the vertical orientation of the support pedestal during boom movement.

Power means are provided for accomplishing vertical movement of the boom, and such means are here shown as including hydraulic cylinder motors indicated generally at 346 and 347 for actuating arms 336 and 337 respectively. The piston 348 of hydraulic motor 346 is pivotally connected at 349 to a downwardly extending rear skirt 350 of actuator arm 336, and piston 351 of motor 347 is similarly attached to actuator arm 337. Control means indicated generally at 352 are provided to control the application of pressurized fluid to the motors 346, 347 in conventional manner whose details form no part of the present invention. The rear ends of motors 346, 347 are pivotally connected to dolly rear section 323 for rotation about a common horizontal axis 353.

Steering means are provided in dolly 42 for simultaneously rotating each of the four wheel assemblies about their vertical mounting axes, the arrangement being such that all four wheel assemblies are at all times parallel to one another. As best seen in FIG. 17, a steering control lever indicated generally at 360 includes an upper pair of oppositely extending handles 361 and 362 and includes a downwardly extending shaft 363 journaled in upper wall 364 of rear dolly section 323. Mounted on steering shaft 363 is a sprocket 365 engaging a chain 366, which is trained around another sprocket 367 mounted on a vertical drive shaft 368, journaled in bearings 369 mounted within stanchion 44. On the lower end of shaft 368 is mounted a group of sprockets indicated generally at 370 for steering the wheel assemblies of the dolly.

One sprocket 372 of the group of sprockets 370 engages a chain 373 which (see FIGS. 14 and 16) engages a sprocket 374 of the left front wheel assembly indicated generally at 375 of the dolly. More specifically, sprocket 374 is mounted on the upper end of a vertically extending shaft 376 journaled in dolly 42 and projecting downwardly into the left front wheel well 377.

Wheel assembly 375 includes a pair of wheels 378 and 379 mounted symmetrically relative to the vertical axis of shaft 376. At the lower portion of shaft 376 there is provided a housing indicated generally at 380 containing an electric drive motor and differential gearing by which to rotate the wheels 378, 379 under the control of the operator. It will be understood that each of the other three wheel assemblies indicated generally at 381, 382 and 383 is identical to the components of wheel assembly 375 thus far described, and each of the other three wheel assemblies is provided with a sprocket for engaging a chain from one of the other sprockets of the sprocket group 370.

Figure 16:
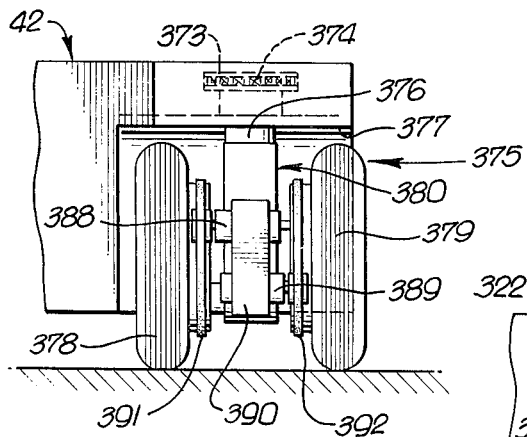
FIG. 16 is a fragmentary view taken on arrows XVI—XVI of FIG. 14.

With continued reference to FIG. 16, means are provided for generating an electrical signal which is a function of dolly movement along the floor. It will be understood that mere manipulation of steering handle 360, and consequent rotation of wheel assembly 375 about the axis of shaft 376, must result in producing a movement signal of zero, despite the fact that each of wheels 378 and 379 rotates about its own horizontal axis, one clockwise and the other counterclockwise, during such steering action. Thus a tachometer generator 388 and a second tachometer generator 389 are mounted on a support bracket 390 fixed to motor housing 380, and each of the tachometer generators is connected by belt means 391 and 392 to wheels 378 and 379 respectively. As will be explained in detail hereinafter, circuitry is provided so that if the output signals of generators 388 and 389 are such as to indicate equal and opposite rotation of wheels 378 and 379, no output signal for dolly movement is produced. But actual travel of the dolly causes generation of a signal proportional to the rate of that travel, and means are provided, responsive to the angular deviation of the dolly wheels from straight ahead, for resolving polar movement indicated by the rate signal into X and Y vectorial component signals. Such means are shown in FIG. 17 as including a potentiometer indicated generally at 396 whose shaft 397 is connected to the shaft on which sprocket 367 is mounted.

With reference to FIGS. 14 and 15, means are provided for generating electrical signals which are a measure of the angular movement of boom 45. Such means are here shown as including a potentiometer indicated generally at 393 and carried by a bracket 394 fixed to stanchion 44, the shaft 395 of potentiometer 393 being connected to boom 45.

With reference to FIGS. 18 and 19, means are provided for generating an electrical signal which is a measure of the angular movement of the camera and its support platform in pan or azimuth. Thus support pedestal 48 includes a centrally apertured horizontal plate indicated generally at 400 having a collar member indicated generally at 402 fixed thereto by an annular nut 403. The upper portion of collar 402 is attached to a centrally apertured core plate indicated generally at 404 on which is mounted an anti-friction bearing 405. Rotatably mounted on core 404 is an assembly indicated generally at 408 having a pair of laterally spaced upwardly extending arms 409 and 410. Extending between arms 409 and 410 is a central horizontal base 412 having a central annular recess 413 for receiving a disc 414. The latter is retained in desired angular relationship relative to base 412 by fastening elements 416 spaced around the circumference of disc 414, and a downwardly extending shaft 417 is fixed at its upper end to disc 414 and at its lower end is connected to the shaft 418 of a pan or azimuth potentiometer indicated generally at 420.

Figure 20:
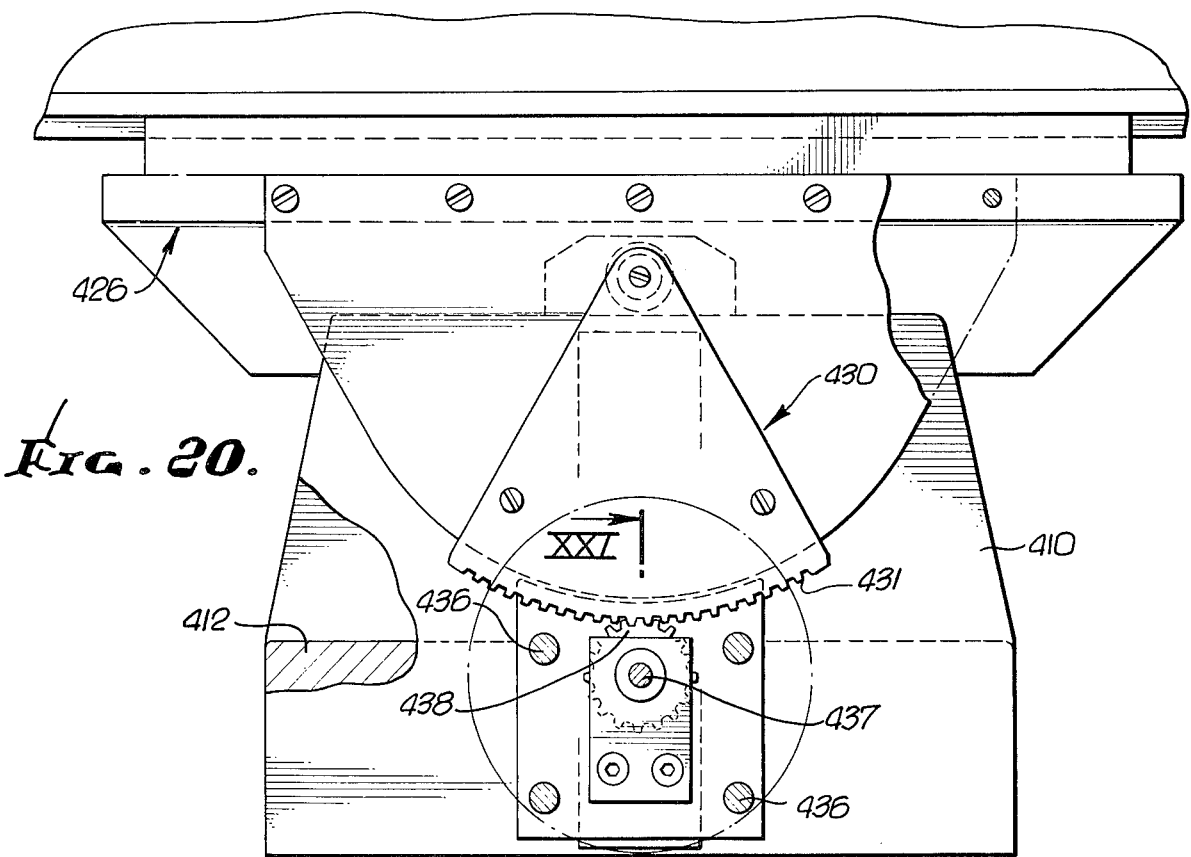
FIG. 20 is a side elevational view taken on arrows XX—XX of FIG. 18.
Figure 21:
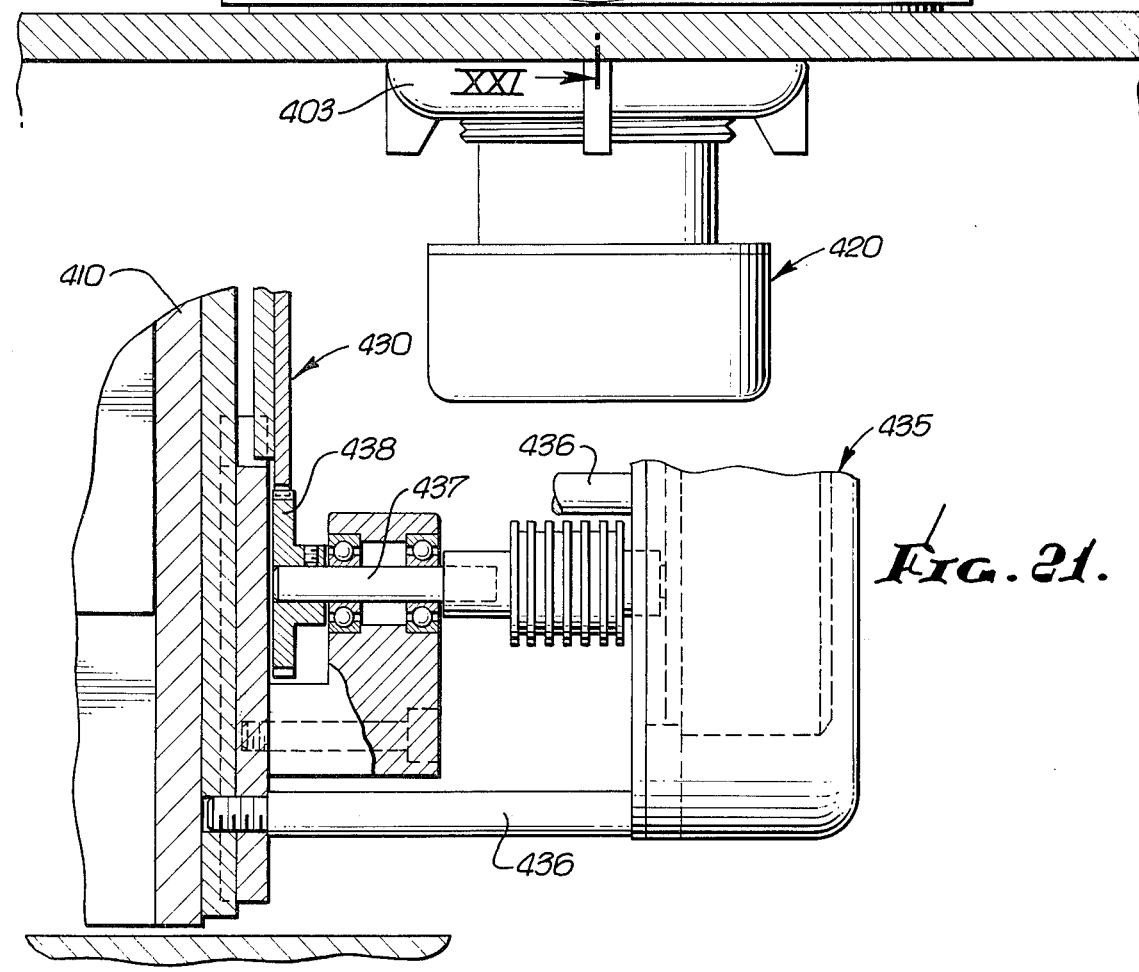
FIG. 21 is a fragmentary sectional view taken on arrows XXI—XXI of FIG. 20.

Referring to FIGS. 18, 20 and 21, means are provided for generating an electrical signal which is a measure of the angular movement of the camera in tilt. Thus each of the vertically extending arms 409, 410 has attached thereto a support bracket 421 and 422 respectively providing a pair of spaced trunnion bearings indicated generally at 423 and 424. A camera support plate indicated generally at 426 is mounted on trunnion bearings 423, 424 for rotation about the horizontal axis of those bearings. Attached to the right edge of support plate 426 is a downwardly extending sector plate indicated generally at 430, provided with a set of gear teeth 431 along its lower periphery. A tilt potentiometer indicated generally at 435 is mounted by suitable rods 436 to upstanding arm 410, and the shaft 437 of the tilt potentiometer has mounted on its inner end a gear 438 which is in meshing engagement with teeth 431 of sector plate 430.

Figure 22:
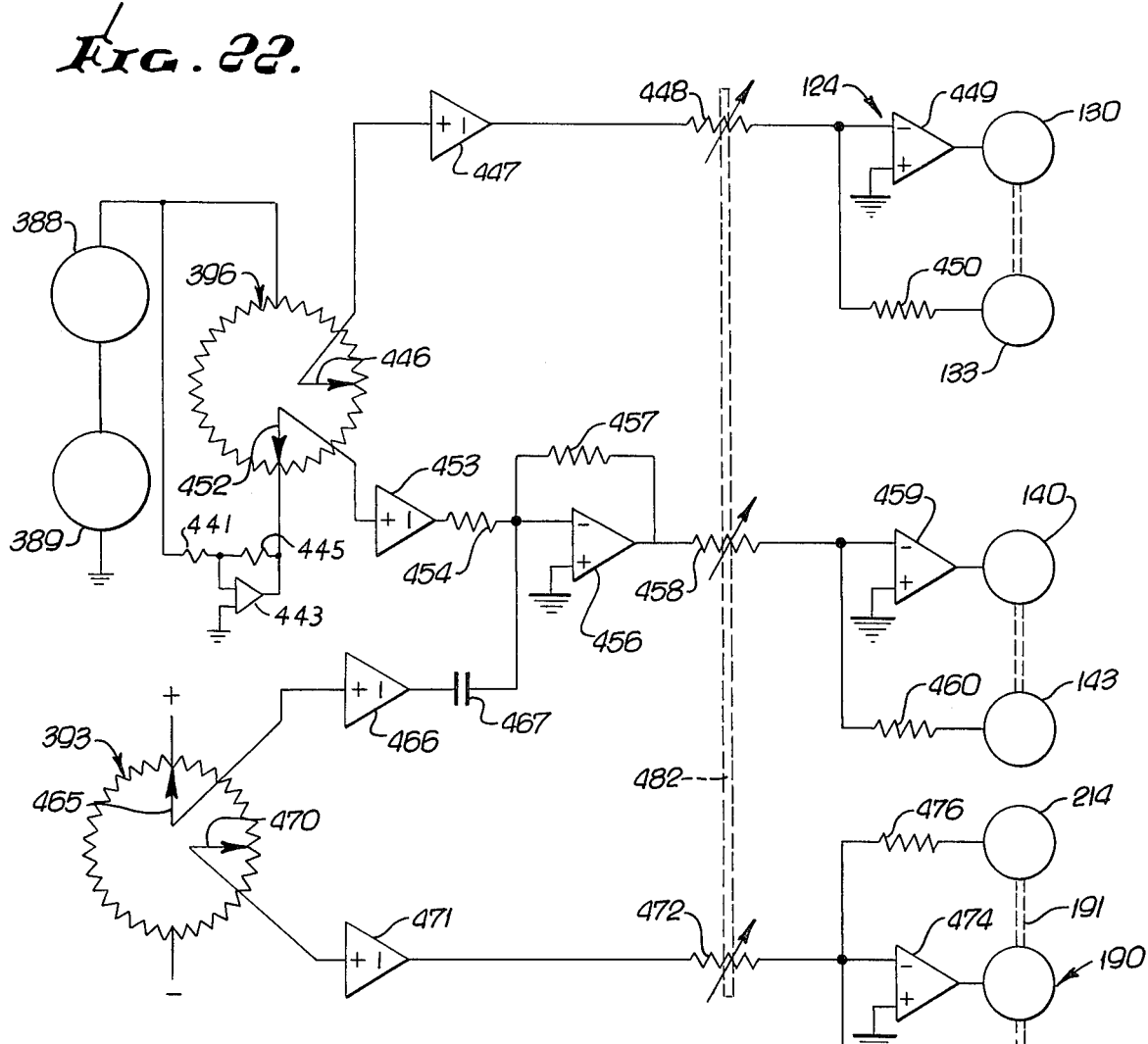
FIG. 22 is a block diagram of important parts of the circuitry of the invention for coupling the cameras in their linear movement.

In FIG. 22 there is shown preferred circuitry means for coupling the linear movement of the FG and BG cameras, including means for scaling the ratio of magnitudes of such movements. Thus tachometer generators 388 and 389 are connected in series. Tachometer 440 is grounded through lead 440. Tachometer 388 is connected to one side of potentiometer 396 and through resistor 441 to polarity inverting amplifier 443. The other input to this amplifier is grounded. The output of this amplifier is connected to the opposite side of potentiometer 396 and to its input through feedback resistor 445. When the output signals of the tachometer generators indicate equal and opposite rotation of their respective wheels, the net output signal of the two generators will be zero. When dolly movement occurs, the net output signal is impressed across sine-cosine potentiometer 396, which it will be recalled is responsive to the deviation of the wheel assemblies from straight ahead. Potentiometer 396 includes a sine wiper 446, whose output signal is fed through buffer amplifier 447 and rheostat 448 to the X drive assembly 124. Within that drive means, the signal is fed through an operational amplifier 449 to motor 130 which is coupled to tachometer generator 133 whose output in turn is fed through resistor 450 to the input of amplifier 449.

The cosine wiper 452 of potentiometer 396 produces an output signal fed through buffer amplifier 453 and resistor 454 to an operational amplifier 456 and including resistor 457. The output of amplifier 456 is fed through rheostat 458 to the Y drive means 102, including operational amplifier 459, motor 140, tachometer generator 143 and resistor 460. The sine and cosine wipers of potentiometer 396 are moved in response to manipulation of the steering assembly, as may be seen in FIG. 17.

Because angular movement of boom 45 about its horizontal axis produces changes in FG camera location in both Y and Z directions, means are provided for combining a function of that angular movement with the basic Y rate signal from cosine wiper 452 to provide a control signal to be fed to Y drive means 102. Thus boom angular movement is measured by sine-cosine potentiometer 393, whose cosine wiper 465 produces a signal which is fed through buffer amplifier 466 to capacitor 467. The signal is there differentiated to produce a rate signal which is fed to the input of operational amplifier 456 and is there summed with the Y signal from cosine wiper 452.

The Z output signal of sine wiper 470 of potentiometer 393 is fed through buffer amplifier 471 and rheostat 472 to an operational amplifier 474 which drives motor 190. As previously described in connection with FIG. 11, motor 190 causes movement of the BG camera in the vertical or Z direction, and its output shaft 192 is connected to potentiometer 207, the opposite output shaft 191 being connected to tachometer generator 214 for stabilizing the system. The tachometer output is fed through resistor 476 to the input of operational amplifier 474, and the signal from wiper 478 of potentiometer 207 is fed through buffer amplifier 479 and resistor 480 to the input of the operational amplifier.

Means are provided for selectively scaling the control signals for linear movement in X, Y and Z directions fed to the respective motor means for causing movement of the BG camera. Such scaling means include adjustable rheostats 448, 458 and 472, which are ganged together as indicated at 482, for simultaneous identical adjustment under the control of the operator.

Figure 23:
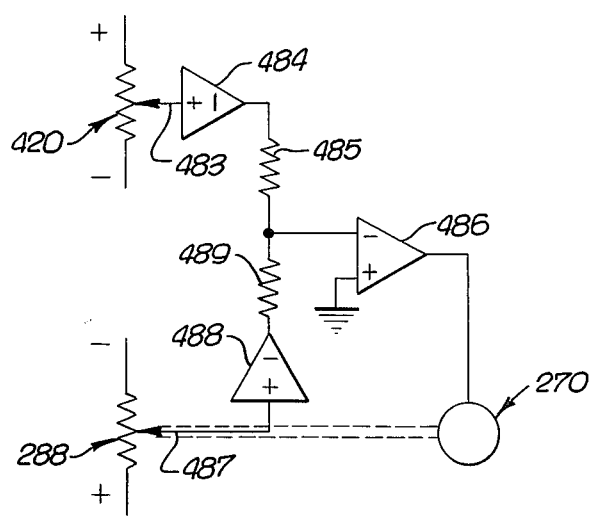
FIG. 23 is a circuit diagram of basic circuitry for coupling the cameras in pan movement.

In FIG. 23 there is shown basic circuitry for coupling the movements of the FG and BG cameras in pan or azimuth. Thus FG camera pan potentiometer 420, previously referred to in connection with FIG. 18, includes a wiper 483 whose output is fed through a buffer amplifier 484 and a summing resistor 485 to an operational amplifier 486 whose output drives pan motor 270 on the BG camera, previously referred to in connection with FIGS. 6 and 8. Motor 270 drives the wiper 487 of potentiometer 288, and the output of wiper 487 is fed through buffer amplifier 488 and summing resistor 489 to the input of amplifier 486. It will accordingly be seen that motor 270 will drive the FG camera in pan and simultaneously move wiper 487 of potentiometer 288, to maintain a null balance of the wiper signals of the two potentiometers.

Figure 24:
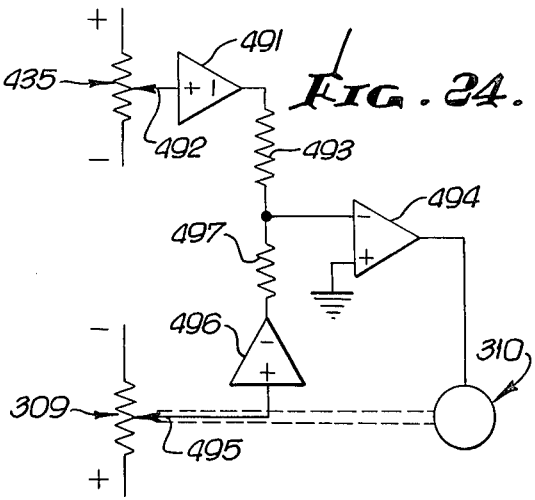
FIG. 24 is a circuit diagram of basic circuitry for coupling the cameras in tilt movement.

In FIG. 24 there is shown circuitry for coupling the FG and BG cameras in tilt movements, the circuit including components corresponding to those of FIG. 23. Thus, the FG camera tilt potentiometer 435, previously referred to in connection with FIGS. 20 and 21, includes a wiper 492 whose output signal is fed through buffer amplifier 491 and summing resistor 493 to an operational amplifier 494. The output of amplifier 494 is fed to the BG camera tilt motor 310, previously referred to in connection with FIGS. 12b and 13, whose movement adjusts the position of wiper 495 of potentiometer 309. The output signal of wiper 495 is fed through buffer amplifier 496 and summing resistor 497 to amplifier 494, and it will accordingly be seen that, similarly to the operation described in connection with FIG. 23, motor 310 will drive wiper 495 to maintain a null balance between the wiper signals of the two potentiometers 309 and 435.

As described in connection with FIGS. 6, 7 and 7a, the illustrative embodiment of the present invention includes means by which to adjust the position of the BG camera in order to compensate for the displacement, in the FG camera, of its nodal point from the mechanical center around which the FG camera moves in pan. Illustratively, let it be assumed that such displacement is 10 inches forward of the pan axis of the FG camera, and let it be further assumed that the background set is miniaturized on a 1:10 scale relative to the foreground scene. Under these conditions, compensation can be made in the BG camera mounting by displacing its optical axis forwardly of the axis of pan movement by a distance of one inch. In accordance with the illustrative embodiment of the invention hereinabove described and shown, this compensation is effected by the adjustment of set screws 291, 292, 293, and the corresponding set screws in the lower support tube 290, as seen in FIG. 4, keeping in mind that the optical and pan axes must be maintained parallel. Thus, the BG camera will effectively view its scene with a perspective corresponding to the perspective with which the FG camera views its scene, and registration of the foreground matte relative to the background scene will thus be maintained.

The displacement required of the prism in the BG camera, in order to compensate he BG camera optical system for the displacement in the FG camera of its nodal point from the axis of tilt movement, is quite minimal in view of the scale factor reduction of tilt motion and thus may be disregarded. However, if such compensation is desired, it may be made by enlarging openings 315 and 318 in bracket plate 308 into slots, to permit motion of reflector prism 312 along the optical axis of the BG camera, whereby to accomplish the compensation in tilt and thus to maintain registration of the scenes viewed by the FG and BG cameras.

In the event that a treadmill is used in place of moving an FG camera in X or Y, the treadmill may be coupled to drive the wheel tachometers 388, 399, instead of having them driven by a dolly wheel.

FIGS. 25 and 26 are respective front and side views of an illustrative nodal point camera support which permits pan and tilt rotation about the nodal point axis of the camera lens. If this type of camera support is used on the FG camera, no compensation for pivotal motions about a camera axis displaced from the nodal point is required in all but certain critical cases of a BG camera of the type shown herein. The camera 500 is attached to an L-shaped bracket 502 which extends forwardly of the camera body alongside of the camera lens holder 504, and is adjacent the nodal point 506.

A shaft 508 is fastened to the L bracket 508 at a location which, when the shaft is turned, pivots the camera about its nodal point. In other words, if the center of the shaft were extended through the lens it would pass through the nodal point. The shaft, 508, is rotatably supported on bearings, not shown, which are mounted in a second L bracket, 510, which parallels the first L bracket, 502, and is spaced therefrom. If a remote control of tilt is desired, a remotely controlled motor 512 is mounted on the L bracket, 510, and has its drive shaft attached to drive shaft 508. Otherwise, the usual manual pan control mechanism may be attached to shaft, 508. A tachometer and potentiometer, 514, 516, may also be mounted on the tilt motor, 512, if desired, and coupled to shaft 508 to provide tilt positional information for a BG camera.

The L bracket, 510, is supported by a shaft, 518, at a location such that if the shaft were extended it would pass through the nodal point of the camera. The shaft, 518, is rotatably supported by a motor, 520. The motor is attached to and supported by the usual boom, 524. For generating signals for providing for a remote location an indication of a panning operation, a tachometer 526 and a potentiometer 528 may be enclosed within the housing of the motor, 522, and coupled to the shaft 518. A remotely controlled panning operation may be effectuated by applying signals to the motor. The tachometer and potentiometer will then generate response signals, which can, in turn be used to remotely control another similar arrangement.

In the event it is desired to use a BG camera which is not mounted for X and Y motion in the manner shown for the BG camera herein, but is mounted on the usual camera dolly, the BG camera dolly can have motors mounted so that it can be steered, and moved in the X, Y and Z directions in response to electrical signals of the type generated by an FG camera as described herein. It is believed well within the capability of those skilled in the art to motorize a dolly so that its motion is controllable in response to electrical signals. Preferrably, both FG and BG cameras should be mounted on nodal point camera supports so that compensation for displacement of a pivotal axis from the nodal point need not be required.

In the event it is desired to remotely control the operations of the FG and BG cameras, a set of controls such as is schematically represented in FIG. 27 may be used. As previously indicated, the camera dolly has motors mounted thereon so that it can be instructed to move and be steered in response to electrical signals. Pan and tilt control motors are also used, shown, for example, in FIG. 25. The dolly also is equipped with potentiometers and tachometers, as described herein, for generating signals to which it is desired the BG camera to respond. FIG. 27 shows a proposed remote control arrangement for directing motion of the FG camera.

All of the motors used to move an FG camera are reversible. An "X-Y move" voltage source 530, has a control, 532, for providing a reversible voltage to a motor 533, which is attached to a wheel, such as 379, which can move the camera dolly forward or backward. A "steer control" voltage source, 534, has a control 536, for providing a reversible voltage for a motor, 537, which is attached to the steering control shaft 363, which can steer the dolly. A "Z control" voltage source, 538, has a control 540, for providing a reversible voltage to a motor 541 which can raise or lower boom 45. A "pan control" voltage source, 542, has a control 544, for providing a reversible voltage to a motor, such as 522, for panning the camera. A tilt voltage source, 546, has a control 548, for providing a reversible voltage, to a motor, such as 512, for tilting the motor. Since the FG camera dolly is also equipped with potentiometers and tachometers, as described herein, as the FG camera is moved in response to the operation of the remote controls shown in FIG. 25, the BG camera will also be moved in response to the signals supplied thereto from the FG camera dolly. Of course, it is possible to feed the same signals from the remote controls simultaneously to both FG and BG camera equipment to obtain simultaneous response, but it is believed more accurate to control the BG camera in response to the response of the FG camera to the remote control signals.

Modifications and changes from the illustrative embodiment of the invention hereinabove described and shown which do not substantially depart from the spirit of the invention are intended to be embraced within the scope of the appended claims.

What is claimed is:

1. In a composite photography system of the registered matte type having foreground and background cameras and objects constituting a reference frame for each camera including a scene in the field of view of each camera, the relation between each camera and its reference frame being moveable whereby to change the perspective of each scene as viewed by its respective camera, wherein the displacement between the nodal point and pivotal axis of the respective foreground camera and background camera are different, the improvement comprising means for coupling linear movement of the cameras relative to the respective frame of reference of each, to maintain the perspectives of the scenes viewed by the cameras substantially identical, and
   means for compensating for said different displacements for maintaining the perspective with which the background camera views its scene substantially synchronized with the perspective with which the foreground camera views its scene during pivotal movement of said foreground camera relative to an object in the scene being viewed.

2. The invention as defined in claim 1 wherein said coupling means includes means slaving linear movement of one of said cameras to that of the other.

3. The invention as defined in claim 1 wherein said coupling means controls camera movement relative to two intersecting axes.

4. The invention as defined in claim 3 wherein the coupling means also controls movement of the background camera in a direction perpendicular to the plane defined by said axes.

5. The invention as defined in claim 1 wherein the background scene is of a size having a predetermined ratio relative to the size of the foreground scene and wherein said coupling means includes means for selectively adjusting the ratio of movement of the background camera relative to that of the foreground camera.

6. The invention as defined in claim 1 wherein the size of objects in the background scene is on a scale substantially smaller than that of objects in the foreground scene, the said background camera having an optical system including a periscopic lens tube for viewing the background scene.

7. The invention as defined in claim 6 including mounting means supporting the cameras for pivotal movement in pan and coupling means for synchronizing camera movements in pan.

8. The invention as defined in claim 6 including mounting means supporting the foreground camera for pivotal movement in tilt, meeans for tilting the angle at which the background camera effectively views its scene, and means for controlling said means for tilting responsive to said foreground camera tilt movement.

9. The invention as defined in claim 8 wherein the nodal point of the foreground camera is displaced by a predetermined distance from the pivotal axis of said camera and said background camera includes means for compensating for the displacement of said foreground camera pivotal axis from its nodal point for maintaining the perspective with which the background camera views its scene synchronized with the perspective with which the foreground camera views its scene during pivotal movement.

10. The invention as defined in claim 9 wherein said periscopic lens tube is provided, at the end distant from the background camera, with a reflector for reflecting light from the background scene into the periscopic lens tube, wherein said tilting means comprises means for mounting the reflector for pivotal movement about an axis perpendicular to the axis of said tube, wherein there is included means for supporting said background camera for pivoting about an axis which passes through its nodal point, and wherein said means for compensating includes means within said means for supporting for displacing the pivotal axis from the axis which passes through the nodal point by a distance which compensates for the displacement of the foreground camera pivotal axis from its nodal point.

11. The invention as defined in claim 9 wherein the mounting means for the background camera includes selectively adjustable means for displacing the optical axis of the background camera from its pivotal axis in pan while maintaining said axes parallel.

12. In a composite photography system of the registered matte type having foreground and background cameras and objects constituting a reference frame for each camera including a scene in the field of view of each camera, the size of objects in the background scene being on a scale substantially different from that of objects in the foreground scene, mounting means supporting each camera for movement about a pivotal axis whereby to change the perspective of each scene as viewed by its respective camera, the nodal point of the foreground camera being displaced by a predetermined distance from its pivotal axis, and the cameras being coupled for synchronizing the pivotal movement of both cameras, the provision of:

means for maintaining the perspective with which the background camera views its scene synchronized with the perspective with which the foreground camera views its scene during coupled pivotal movement of the cameras.

13. The invention as defined in claim 12 wherein said pivotal movement of said cameras is in pan.

14. The invention as defined in claim 12 wherein the background camera has an optical system including a periscopic lens tube for viewing the background scene, said periscope lens tube has a means for providing a pivotal axis for the optical axis of said periscope lens tube, and wherein the maintaining means for the background camera includes selectively adjustable means for displacing the pivotal axis of the periscopic lens tube along a plane parallel to the film plane of said camera a distance to compensate for the displacement of the nodal point of said foreground camera from its pivotal axis.

15. In a composite photography system of the registered matte type having foreground and background cameras and objects constituting a reference frame for each camera including a scene in the field of view of each camera, the size of the objects in the background scene being on a scale substantially different from that of objects in the foreground scene, and mounting means supporting each camera for three dimensional movement and for movement in pan and tilt, the improvement comprising sensing means attached to said foreground camera mounting means for generating electrical signals representative of the three dimensional motions of said foreground camera as well as motions in pan and tilt, and motor means attached to said mounting means supporting said background camera and responsive to the electrical signal output of said sensing means for causing movements of said background camera which will maintain synchronized during and after movement the perspectives with which said foreground and background cameras view their respective scenes.

16. In a composite photography system as recited in claim 15 wherein said sensing means includes a means for scaling said electrical signals representative of the three dimensional motions of said foreground camera to compensate for the difference in sizes of the objects being viewed by both cameras.

17. In a composite photography system as recited in claim 15 wherein said mounting means for said respective foreground and background cameras include means for respectively mounting them for pivotal motion about their respective nodal points.

18. In a composite photography system as recited in claim 15 including means for remotely controlling the movement of said mounting means supporting said foreground camera.

19. In a composite photography system as recited in claim 15 wherein there is included means for generating simulated motion electrical signals representative of linear motion simulated within said foreground scene, and means for applying said simulated motion electrical signals to said motor means to cause movements of said background camera which maintain synchronized the perspectives which foreground and background cameras view their scenes.

20. In a composite photography system as recited in claim 15 wherein said mounting means for said foreground camera includes means establishing a pivotal axis for pivotal movement which pivotal axis is displaced by a predetermined distance from the nodal point of said foreground camera, said background camera includes means for compensating for the displacement of the pivotal axis from the nodal point of said foreground camera for maintaining the perspectives with which said foreground and background cameras view their respective scenes substantially correct.

21. In a composite photography system as recited in claim 20 wherein said background camera has a periscope lens tube for viewing the background scene, said mounting means for said background camera includes framework means for supporting said camera for motion in three dimensions, and rotating means for supporting said camera for rotation about a pivotal axis.

22. In a composite photography system as recited in claim 21 wherein said periscope lens tube has mounted at its scene viewing end a reflector means for reflecting light from a background scene into the periscope lens tube, said rotating means includes means for adjusting the location of the pivotal axis about which said camera is supported for rotation to compensate for nodal point displacement from the pivotal axis of said foreground camera.

23. In a composite photography system as recited in claim 22 wherein said reflector means is pivotally mounted for pivoting about an axis perpendicular to the optical axis for producing motions in tilt.

* * * * *